US010726367B2

(12) United States Patent
Theriault et al.

(10) Patent No.: US 10,726,367 B2
(45) Date of Patent: Jul. 28, 2020

(54) RESOURCE ALLOCATION FORECASTING

(71) Applicant: Apptio, Inc., Bellevue, WA (US)

(72) Inventors: Eric Yves Theriault, Seattle, WA (US); Paul Damien McLachlan, Newcastle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/981,747

(22) Filed: Dec. 28, 2015

(65) Prior Publication Data

US 2017/0185929 A1 Jun. 29, 2017

(51) Int. Cl.
*G06Q 10/06* (2012.01)

(52) U.S. Cl.
CPC ..... *G06Q 10/06312* (2013.01); *G06Q 10/067* (2013.01)

(58) Field of Classification Search
CPC . G06Q 10/06312; G06Q 10/067; G06Q 40/12
USPC ......................... 705/7.22, 30, 348
See application file for complete search history.

(56) References Cited

U.S. PATENT DOCUMENTS

| | | | |
|---|---|---|---|
| 4,744,026 A | 5/1988 | Vanderbei | |
| 5,249,120 A | 9/1993 | Foley | |
| 5,615,121 A | 3/1997 | Babayev et al. | |
| 5,721,919 A | 2/1998 | Morel et al. | |
| 5,758,327 A | 5/1998 | Gardner et al. | |
| 5,799,286 A | 8/1998 | Morgan et al. | |
| 5,802,508 A | 9/1998 | Morgenstern | |
| 5,903,453 A | 5/1999 | Stoddard, II | |
| 5,970,476 A | 10/1999 | Fahey | |
| 5,991,741 A | 11/1999 | Speakman et al. | |

(Continued)

FOREIGN PATENT DOCUMENTS

JP 2011134268 A 7/2011

OTHER PUBLICATIONS

A clustering approach for scenario tree reduction: an application to a stochastic programming portfolio optimization problem, Beraldi et al., Accepted: Oct. 30, 2013 / Published online: Dec. 5, 2013 © Sociedad de Estadistica e Investigacion Operativa, pp. 934-949 (Year: 2013).*

(Continued)

*Primary Examiner* — Timothy Padot
*Assistant Examiner* — Darlene Garcia-Guerra
(74) *Attorney, Agent, or Firm* — John W. Branch; Lowe Graham Jones PLLC

(57) ABSTRACT

Embodiments are directed towards for managing data models, including resource allocation forecasting. A main data model may be provided. A delta ratio value based on a difference between modified cloned resource values and their corresponding original resource values in the main data model may be provided. Line items from the cloned data model associated with the one or more modified cloned resource values may be provided. Each of the cloned line items may be modified based on the delta ratio value. The modified cloned line items may be stored in the cloned data model. Reports including report information based on the cloned data model may be provided. The report information may indicate changes that were made to one or more other cloned resource values based on the modifications to the one or more cloned resource values.

30 Claims, 11 Drawing Sheets

(56) References Cited

U.S. PATENT DOCUMENTS

| | | | |
|---|---|---|---|
| 6,014,640 A | 1/2000 | Bent | |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 | 1/2003 | Sun | |
| 6,578,005 B1 | 6/2003 | Lesaint et al. | |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,305,491 B2 | 12/2007 | Miller et al. | |
| 7,308,427 B1 | 12/2007 | Hood | |
| 7,321,869 B1 | 1/2008 | Phibbs, Jr. | |
| 7,386,535 B1 | 6/2008 | Kalucha et al. | |
| 7,418,438 B2 | 6/2008 | Gould et al. | |
| 7,505,888 B2 | 3/2009 | Legault et al. | |
| 7,590,937 B2 | 9/2009 | Jacobus et al. | |
| 7,634,431 B2 | 12/2009 | Stratton | |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,761,548 B2 | 7/2010 | Snyder et al. | |
| 7,769,654 B1 | 8/2010 | Hurevvitz | |
| 7,774,458 B2 | 8/2010 | Trinon et al. | |
| 7,783,759 B2 | 8/2010 | Eilam et al. | |
| 7,801,755 B2 | 9/2010 | Doherty et al. | |
| 7,805,400 B2 | 9/2010 | Teh et al. | |
| 7,813,948 B2 | 10/2010 | Ratzloff | |
| 7,852,711 B1 | 12/2010 | Fitzgerald et al. | |
| 7,870,051 B1 | 1/2011 | En et al. | |
| 7,877,742 B2 | 1/2011 | Duale et al. | |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 7,966,266 B2 | 6/2011 | Delvat | |
| 8,010,584 B1 | 8/2011 | Craver et al. | |
| 8,024,241 B2 | 9/2011 | Bailey et al. | |
| 8,073,724 B2 | 12/2011 | Harthcryde et al. | |
| 8,121,959 B2 | 2/2012 | Delvat | |
| 8,175,863 B1 | 5/2012 | Ostermeyer | |
| 8,195,524 B2 | 6/2012 | Sandholm et al. | |
| 8,195,785 B2 | 6/2012 | Snyder et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,214,829 B2 | 7/2012 | Neogi et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 | 4/2013 | Grendel et al. | |
| 8,484,355 B1 | 7/2013 | Lochhead et al. | |
| 8,543,438 B1* | 9/2013 | Fleiss | G06Q 10/0631 |
| | | | 705/7.11 |
| 8,600,830 B2 | 12/2013 | Hoffberg | |
| 8,601,263 B1 | 12/2013 | Shankar et al. | |
| 8,606,827 B2 | 12/2013 | Williamson | |
| 8,655,714 B2 | 2/2014 | Weir et al. | |
| 8,667,385 B1 | 3/2014 | Mui et al. | |
| 8,766,981 B2 | 7/2014 | McLachlan et al. | |
| 8,768,976 B2 | 7/2014 | McLachlan et al. | |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,996,552 B2 | 3/2015 | Munkes et al. | |
| 9,015,692 B1* | 4/2015 | Clavel | G06F 17/30861 |
| | | | 717/168 |
| 9,020,830 B2 | 4/2015 | Purpus et al. | |
| 9,104,661 B1 | 8/2015 | Evans | |
| 9,213,573 B2 | 12/2015 | French et al. | |
| 9,268,964 B1 | 2/2016 | Schepis et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1* | 10/2017 | Mohler | G06N 7/005 |
| 10,152,722 B2* | 12/2018 | Heath | G06Q 30/02 |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0087441 A1 | 7/2002 | Wagner, Jr. et al. | |
| 2002/0107914 A1 | 8/2002 | Charisius et al. | |
| 2002/0123945 A1 | 9/2002 | Booth et al. | |
| 2002/0129342 A1 | 9/2002 | Kil et al. | |
| 2002/0145040 A1 | 10/2002 | Grabski | |
| 2002/0154173 A1 | 10/2002 | Etgen et al. | |
| 2002/0156710 A1 | 10/2002 | Ryder | |
| 2002/0174006 A1 | 11/2002 | Rugge et al. | |
| 2002/0174049 A1* | 11/2002 | Kitahara | G06Q 10/10 |
| | | | 705/36 R |
| 2002/0178198 A1 | 11/2002 | Steele | |
| 2002/0194329 A1 | 12/2002 | Alling | |
| 2003/0019350 A1 | 1/2003 | Khosla | |
| 2003/0074269 A1 | 4/2003 | Viswanath | |
| 2003/0083388 A1 | 5/2003 | L'Alloret | |
| 2003/0083888 A1 | 5/2003 | Argenton et al. | |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172018 A1 | 9/2003 | Chen et al. | |
| 2003/0172368 A1 | 9/2003 | Alumbaugh et al. | |
| 2003/0195780 A1 | 10/2003 | Arora et al. | |
| 2003/0208493 A1 | 11/2003 | Hall et al. | |
| 2003/0217033 A1 | 11/2003 | Sandler et al. | |
| 2003/0233301 A1 | 12/2003 | Chen et al. | |
| 2003/0236721 A1 | 12/2003 | Plumer et al. | |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133676 A1 | 7/2004 | Sproule | |
| 2004/0138942 A1 | 7/2004 | Pearson et al. | |
| 2004/0186762 A1 | 9/2004 | Beaven et al. | |
| 2004/0243438 A1 | 12/2004 | Mintz | |
| 2004/0249737 A1 | 12/2004 | Tofte | |
| 2005/0004856 A1 | 1/2005 | Brose et al. | |
| 2005/0033631 A1 | 2/2005 | Wefers et al. | |
| 2005/0038788 A1 | 2/2005 | Dettinger et al. | |
| 2005/0044224 A1 | 2/2005 | Jun et al. | |
| 2005/0060298 A1 | 3/2005 | Agapi et al. | |
| 2005/0060317 A1 | 3/2005 | Lott et al. | |
| 2005/0071285 A1 | 3/2005 | Laicher et al. | |

(56) References Cited

U.S. PATENT DOCUMENTS

| | | |
|---|---|---|
| 2005/0091102 A1 | 4/2005 | Retsina |
| 2005/0120032 A1 | 6/2005 | Liebich et al. |
| 2005/0131870 A1* | 6/2005 | Krishnaswamy .......................... G06F 17/30551 |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1* | 1/2006 | Netz ................ G06F 17/30489 |
| 2006/0010294 A1* | 1/2006 | Pasumansky ..... G06F 17/30554 711/123 |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1* | 5/2006 | Johanson ................ G06Q 10/06 705/7.37 |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakav |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1* | 8/2007 | Carlson ............... G06F 17/3087 705/26.8 |
| 2007/0198317 A1 | 8/2007 | Harthcryde et al. |
| 2007/0198390 A1* | 8/2007 | Lazear ................... G06Q 40/00 705/36 T |
| 2007/0198982 A1 | 8/2007 | Bolan et al. |
| 2007/0214413 A1 | 9/2007 | Boeckenhauer |
| 2007/0226064 A1* | 9/2007 | Yu ........................ G06Q 20/201 705/20 |
| 2007/0226090 A1 | 9/2007 | Stratton |
| 2007/0233439 A1* | 10/2007 | Carroll ................ G06F 17/5022 703/6 |
| 2007/0260532 A1 | 11/2007 | Blake, III |
| 2007/0265896 A1* | 11/2007 | Smith ..................... G06Q 10/06 705/7.37 |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1* | 5/2008 | Olenski ................. G01C 15/00 705/1.1 |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0221949 A1* | 9/2008 | Delurgio ............... G06Q 10/04 705/7.11 |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1* | 12/2008 | Casey ..................... G06Q 10/06 705/7.13 |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0018996 A1* | 1/2009 | Hunt ...................... G06Q 30/02 |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0210275 A1 | 8/2009 | Andreev et al. |
| 2009/0216580 A1 | 8/2009 | Bailey et al. |
| 2009/0222742 A1* | 9/2009 | Pelton ..................... G06Q 10/10 715/753 |
| 2009/0234892 A1 | 9/2009 | Anglin et al. |
| 2009/0300173 A1* | 12/2009 | Bakman ................ G06F 11/008 709/224 |
| 2009/0307597 A1* | 12/2009 | Bakman ................ G06F 11/008 715/736 |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 3/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0238608 A1 | 8/2011 | Sathish |
| 2011/0225277 A1 | 9/2011 | Freimuth et al. |
| 2011/0261049 A1* | 10/2011 | Cardno ................... G06Q 10/10 345/419 |

(56) References Cited

U.S. PATENT DOCUMENTS

| | | |
|---|---|---|
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1* | 9/2012 | McLachlan ............ G06Q 10/06 705/7.23 |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0014057 A1 | 1/2013 | Reinpoldt et al. |
| 2013/0028537 A1 | 1/2013 | Miyake et al. |
| 2013/0041792 A1* | 2/2013 | King ...................... G06Q 50/00 705/30 |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103369 A1* | 4/2013 | Huynh ................. G06F 17/5018 703/2 |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0290470 A1* | 10/2013 | CaraDonna ......... H04L 67/1097 709/214 |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1* | 1/2014 | Hericks ................. G06Q 30/06 705/28 |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0108295 A1 | 4/2014 | Renshaw |
| 2014/0122374 A1* | 5/2014 | Hacigumus ........ G06Q 30/0283 705/400 |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1* | 9/2014 | George .............. G06Q 30/0283 705/26.1 |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0337007 A1* | 11/2014 | Waibel ................. G06F 17/289 704/3 |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1* | 1/2015 | Lord ................. G06F 17/30864 707/752 |
| 2015/0012328 A1 | 1/2015 | McLachlan et al. |
| 2015/0046363 A1* | 2/2015 | McNamara ........ G06Q 10/0833 705/333 |
| 2015/0066808 A1 | 3/2015 | Legare et al. |
| 2015/0074075 A1 | 3/2015 | Alexander |
| 2015/0088584 A1* | 3/2015 | Santiago, III .... G06Q 10/06315 705/7.25 |
| 2015/0120370 A1* | 4/2015 | Agrawal .......... G06Q 10/06315 705/7.25 |
| 2015/0227991 A1 | 8/2015 | Yu |
| 2015/0278024 A1* | 10/2015 | Barman ............ G06F 16/24578 707/634 |
| 2015/0294273 A1 | 10/2015 | Barraci et al. |
| 2015/0302303 A1* | 10/2015 | Hakim ................. G06Q 10/063 706/11 |
| 2015/0341230 A1 | 11/2015 | Dave et al. |
| 2015/0363725 A1* | 12/2015 | Andersson ......... G06Q 10/0631 705/7.23 |
| 2015/0379061 A1* | 12/2015 | Paraschivescu .. G06F 17/30551 707/695 |
| 2016/0063577 A1* | 3/2016 | Yellin ................ G06Q 30/0277 705/14.73 |
| 2016/0098234 A1* | 4/2016 | Weaver ................. G06F 3/1234 358/1.15 |
| 2017/0091689 A1* | 3/2017 | Elliott ................... H04L 47/822 |
| 2017/0102246 A1 | 4/2017 | Yang |
| 2017/0154088 A1* | 6/2017 | Sherman ............. G06F 9/45558 |
| 2018/0068246 A1 | 3/2018 | Crivat et al. |

OTHER PUBLICATIONS

International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

(56) References Cited

OTHER PUBLICATIONS

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocumenfs/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 dated Jul. 14, 2010, 12 pages.

International Preliminary Report on Patentability for International Patent Application No. PCT/US2010/035021 dated Nov. 24, 2011, 10 pages.

International Search Report and Written Opinion for International Patent Application No. PCT/US2012/028353 dated Oct. 31, 2012, 9 pages.

International Preliminary Report on Patentability for International Patent Application No. PCT/US2012/028353 dated Sep. 19, 2013, 6 pages.

International Search Report and Written Opinion for International Patent Application No. PCT/US2012/028378 dated Sep. 12, 2012, 11 pages.

International Preliminary Report on Patentability for International Patent Application No. PCT/US2012/028378 dated Sep. 19, 2013, 7 pages.

Extended European Search Report in EP Application No. 13151967.0-1955, dated Apr. 19, 2013, 8 pages.

Official Communication for U.S. Appl. No. 12/467,120 dated Oct. 4, 2011, 12 pages.

Official Communication for U.S. Appl. No. 12/467,120 dated Jun. 20, 2012, 17 pages.

Official Communication for U.S. Appl. No. 12/467,120 dated Aug. 29, 2012, 3 pages.

Official Communication for U.S. Appl. No. 12/467,120 dated Oct. 23, 2013, 21 pages.

Official Communication for U.S. Appl. No. 12/467,120 dated Mar. 26, 2013, 18 pages.

Official Communication for U.S. Appl. No. 13/324,253 dated Sep. 25, 2012, 17 pages.

Official Communication for U.S. Appl. No. 13/324,253 dated Jan. 10, 2013, 20 pages.

Official Communication for U.S. Appl. No. 13/324,253 dated Mar. 19, 2013, 3 pages.

Official Communication for U.S. Appl. No. 13/324,253 dated Sep. 6, 2013, 21 pages.

Official Communication for U.S. Appl. No. 13/415,797 dated Oct. 3, 2013, 17 pages.

Official Communication for U.S. Appl. No. 13/452,628 dated Apr. 22, 2013, 11 pages.

Official Communication for U.S. Appl. No. 13/675,837 dated Oct. 10, 2013, 41 pages.

Official Communication for U.S. Appl. No. 13/837,815 dated Oct. 23, 2013, 9 pages.

Official Communication for U.S. Appl. No. 13/917,478 dated Nov. 7, 2013, 15 pages.

Official Communication for U.S. Appl. No. 13/917,503 dated Oct. 10, 2013, 41 pages.

Official Communication for U.S. Appl. No. 13/935,147 dated Oct. 22, 2013, 16 pages.

Official Communication for U.S. Appl. No. 13/649,019 dated Sep. 23, 2015, 15 pages.

Official Communication for U.S. Appl. No. 13/365,150 dated Sep. 24, 2015, 15 pages.

Official Communication for U.S. Appl. No. 14/033,130 dated Sep. 15, 2015, 22 pages.

Official Communication for U.S. Appl. No. 13/452,628 dated Jan. 12, 2016, 21 pages.

Official Communication for U.S. Appl. No. 13/649,019 dated Jan. 4, 2016, 8 pages.

European Examination Report for Application No. 14159413.5 dated Jul. 15, 2015, 9 pages.

Office Communication for U.S. Appl. No. 13/415,701 dated Oct. 27, 2015, 16 pages.

Official Communication for U.S. Appl. No. 14/869,721 dated Jan. 13, 2016, 57 pages.

Office Communication for U.S. Appl. No. 13/675,837 dated Oct. 26, 2015, 20 pages.

Office Communication for U.S. Appl. No. 13/917,503 dated Oct. 22, 2015, 19 pages.

Office Communication for U.S. Appl. No. 14/722,663 dated Dec. 1, 2015, 37 pages.

Official Communication for U.S. Appl. No. 13/452,628 dated Nov. 18, 2013, 15 pages.

Official Communication for U.S. Appl. No. 14/033,130 dated Dec. 16, 2013, 15 pages.

Official Communication for U.S. Appl. No. 13/324,253 dated Jan. 23, 2014, 15 pages.

Official Communication for U.S. Appl. No. 13/675,837 dated Jan. 31, 2014, 37 pages.

Official Communication for U.S. Appl. No. 13/917,503 dated Jan. 31, 2014, 25 pages.

Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.

Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.

Ward Miles, Optimizing for Cost in the Cloud (selection), AWS Summit Slideshare Apr. 2012 http://www.slidehare.net/AmazonWebServices/optimizing-your-infrastructure-costs-on-aws.

Amazon Reserved Instances, Amazon Web Services, archives org, Jan. 14, 2013 http://web.archive.org/web/2012011453849/http://aws.amazon.com/rds/reserved-instances/?.

(56) References Cited

OTHER PUBLICATIONS

Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 4, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,308 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015, 14 pages.
European Search Report for Application No. 12755513.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No 13/415,797 dated Oct. 19, 2015, 3 pages.
Official Communication for U.S. Appl. No. 13/837,815 dated Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Developmentof Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Office Communication for U.S. Appl. No. 14/867,552, dated Apr. 25, 2016, 12 pages.
Office Communication for U.S. Appl. No. 14/033,130, dated Apr. 25, 2016, 4 pages.
Office Communication for U.S. Appl. No. 14/971,944, dated May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.

(56) References Cited

OTHER PUBLICATIONS

Official Communication for U.S. Appl. No. 14/869,721 dated Jun. 1, 2016, 35 pages.
Official Communication for U.S. Appl. No. 14/977,368 dated Jun. 7, 2016, 11 pages.
Official Communication for U.S. Appl. No. 13/837,815 dated Jun. 23, 2016, 3 pages.
Official Communication for U.S. Appl. No. 14/846,349 dated Jul. 1, 2016, 24 pages.
Official Communication for U.S. Appl. No. 14/367,552 dated Oct. 3, 2016, 19 pages.
Official Communication for U.S. Appl. No. 14/130,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 13/415,797 dated Apr. 14, 2017, 3 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/537,815 dated Jun. 12, 2017, 12 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 15/271,013 dated May 24, 2017, 37 pages.
Official Communication for U.S. Appl. No. 14/180,308 dated May 25, 2017, 21 pages.
Official Communication for U.S. Appl. No. 14/867,552 dated Nov. 29, 2017, 12 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/846,349 dated Jan. 18, 2018, 29 pages.
Official Communication for U.S. Appl. No. 13/837,815 dated Jan. 26, 2018, 12 pages.
Official Communication for U.S. Appl. No. 14/869,721 dated Jan. 19, 2018, 3 pages.
Official Communication for U.S. Appl. No. 14/867,552 dated Feb. 13, 2018, 3 pages.
Official Communication for U.S. Appl. No. 15/859,008 dated Mar. 5, 2018, 20 pages.
Official Communication for U.S. Appl. No. 13/935,147 dated Jan. 17, 2018, 3 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/917,503 dated Apr. 1, 2019, pp. 1-34.
Official Communication for U.S. Appl. No. 13/935,147 dated Mar. 28, 2019, pp. 1-16.
Official Communication for U.S. Appl. No. 14/033,130 dated Apr. 10, 2019, pp. 1-9.
Official Communication for U.S. Appl. No. 14/180,308 dated Feb. 26, 2019, pp. 1-28.
Official Communication for U.S. Appl. No. 14/867,552 dated Feb. 11, 2019, pp. 1-8.
Official Communication for U.S. Appl. No. 15/260,221 dated Jan. 8, 2019, pp. 1-19.
Official Communication for U.S. Appl. No. 15/271,013 dated Mar. 28, 2019, pp. 1-53.
Official Communication for U.S. Appl. No. 15/351,313 dated Apr. 1, 2019, pp. 1-31.
Official Communication for U.S. Appl. No. 15/585,945 dated Feb. 6, 2019, pp. 1-15.
Official Communication for U.S. Appl. No. 15/859,058 dated Mar. 25, 2019, pp. 1-24.
Official Communication for U.S. Appl. No. 15/859,008 dated Apr. 12, 2019, pp. 1-19.
Official Communication for U.S. Appl. No. 13/917,503 dated Nov. 20, 2018, pp. 1-55.
Official Communication for U.S. Appl. No. 13/917,147 dated Aug. 10, 2018, pp. 1-25.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 14/867,552 dated Nov. 21, 2018, pp. 1-37.
Official Communication for U.S. Appl. No. 14/869,721 dated Oct. 11, 2018, pp. 1-73.
Official Communication for U.S. Appl. No. 15/260,221 dated Oct. 5, 2018, pp. 1-40.
Official Communication for U.S. Appl. No. 15/271,013 dated Jul. 6, 2018, pp. 1-49.
Official Communication for U.S. Appl. No. 15/858,945 dated Aug. 10, 2018, pp. 1-25.
Official Communication for U.S. Appl. No. 15/858,008 dated Jul. 31, 2018, pp. 1-28.
Official Communication for U.S. Appl. No. 15/859,058 dated Dec. 5, 2018, pp. 1-20.
Official Communication for U.S. Appl. No. 15/379,267 dated Jul. 19, 2018, pp. 1-34.

(56) References Cited

OTHER PUBLICATIONS

Official Communication for U.S. Appl. No. 15/379,267 dated Oct. 18, 2018, pp. 1-9.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 14/867,552 dated May 31, 2018, pp. 1-22.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 15/271,013 dated Jun. 14, 2019, pp. 1-8.
Selen, et al. "Model-Order Selection: A review of information criterion rules," IEEE Signal Processing Magazine, Jul. 2004, pp. 38-47.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Official Communication for U.S. Appl. No. 14/180,308 dated Dec. 10, 2019, pp. 1-29.
Official Communication for U.S. Appl. No. 14/846,349 dated Oct. 18, 2019, pp. 1-52.
Official Communication for U.S. Appl. No. 15/271,013 dated Nov. 21, 2019, pp. 1-108.
Official Communication for U.S. Appl. No. 15/859,008 dated Oct. 24, 2019, pp. 1-22.
Daytime vs Night display on Garmin GPS , POI Factory, Jun. 2008, http://www.poi-factory.com/node/14562 (Year: 2008), pp. 1-3.
Official Communication for U.S. Appl. No. 13/917,503 dated Dec. 31, 2019, pp. 1-28.
Official Communication for U.S. Appl. No. 14/846,349 dated Jan. 21, 2020, pp. 1-6.
Official Communication for U.S. Appl. No. 15/859,008 dated Feb. 26, 2020, pp. 1-8.
Official Communication for U.S. Appl. No. 14/180,308 dated Mar. 9, 2020, pp. 1-5.

* cited by examiner

| | APP | SRV | DC | A/R | Cost |
|---|---|---|---|---|---|
| | W1 | S1 | CHI | 0 | $0 |
| | W2 | S1 | CHI | 0 | $0 |
| | W1 | S2 | CHI | 0 | $0 |
| | W2 | S2 | CHI | 0 | $0 |
| | W1 | S3 | CHI | 0.5 | $21 |
| | W2 | S3 | CHI | 0.5 | $21 |
| | W1 | S4 | CHI | 0.5 | $21 |
| | W2 | S4 | CHI | 0.5 | $21 |
| | W1 | S5 | CHI | 0.5 | $49 |
| | W2 | S5 | CHI | 0.5 | $49 |
| | W1 | S1 | SEA | 0.5 | $49 |
| | W2 | S1 | SEA | 0.5 | $49 |
| | W1 | S2 | SEA | 0.5 | $49 |
| | W2 | S2 | SEA | 0 | $0 |
| | W1 | S3 | SEA | 0 | $0 |
| | W2 | S3 | SEA | 0 | $0 |
| | W1 | S4 | SEA | 0 | $0 |
| | W2 | S4 | SEA | 0 | $0 |
| | W1 | S5 | SEA | 0 | $0 |
| | W2 | S5 | SEA | 0 | $0 |

502 → APP, 504 → SRV, 506 → DC, 508 → A/R, 510 → Cost

| | |
|---|---|
| W1->SEA | $98 |
| W1->CHI | $63 |
| W2->SEA | $98 |
| W2->CHI | $63 |

| | Location | Actual | What-if? | Delta | D. Ratio |
|---|---|---|---|---|---|
| 614 → | SEA | $196 | $147 | $49 | 0.25 |
| | CHI | $124 | n/a | n/a | n/a |

*FIG. 6A*

| | ID | LOC | OS | Apps | Cost | What-If? |
|---|---|---|---|---|---|---|
| 622 → | S1 | SEA | WIN | ... | $98 | $73.50 |
| 624 → | S2 | SEA | WIN | ... | $98 | $73.50 |
| | S3 | CHI | LNX | ... | $41 | $41.00 |
| | S4 | CHI | LNX | ... | $41 | $41.00 |
| | S5 | CHI | LNX | ... | $41 | $41.00 |

| | ID | Cost | What-if? |
|---|---|---|---|
| 630 → | SEA | $196 | $147 |
| | CHI | $124 | $124 |

| Host | App | OS | Cost | Count |
|---|---|---|---|---|
| A | App1 | Linux | $100 | 1 |
| B | App2 | Linux | $100 | 1 |
| C | App3 | Linux | $100 | 1 |
| D | App4 | Linux | $100 | 1 |
| E | App5 | Linux | $100 | 1 |

630

638

636

| OS | App | Host | Cost | Count |
|---|---|---|---|---|
| Windows | App1 | {various} | $200 | 2 |
| Linux | App2 | {various} | $200 | 2 |

*FIG. 6C*

RESOURCE ALLOCATION FORECASTING

TECHNICAL FIELD

The present invention relates generally to computer automated activity based budget modeling, forecasting and cost accounting, and more particularly, but not exclusively to what-if analysis of complex data models.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial models may increase as the number of tracked activities and elements increases. Therefore, for larger enterprises, sophisticated computer programs and computers are often required to assist in generating useful and relevant budgets based on financial models. In some cases, the large number of items and entities required for financial modeling can make development of modeling applications difficult. Further, the size and complexity of modern financial allocation models can make it difficult to generate reporting information based on the model because of prohibitively long computation times. Also, for complex models the long computation times may impede a user's from performing what-if analysis and/or resource allocation forecasting. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 5 illustrates a logical representation of an allocation ratio table showing a drill-down view of resource value allocation in accordance with at least one of the various embodiments;

FIG. 6A illustrates a logical represent of a table that illustrates determining what-if delta values that may be used to provide accelerated what-if analysis in exchange for a loss of some accuracy and/or precision in accordance with at least one of the various embodiments;

FIG. 6B illustrates a data model portion that shows how the change in data center costs may affects the servers represented by modified server object in accordance with at least one of the various embodiments;

FIG. 6C illustrates a data model portion that shows how the change to line items in what-if scenarios may be accommodated in the forecasting model in accordance with at least one of the various embodiments;

DETAILED DESCRIPTION OF THE VARIOUS EMBODIMENTS

Figure 1:
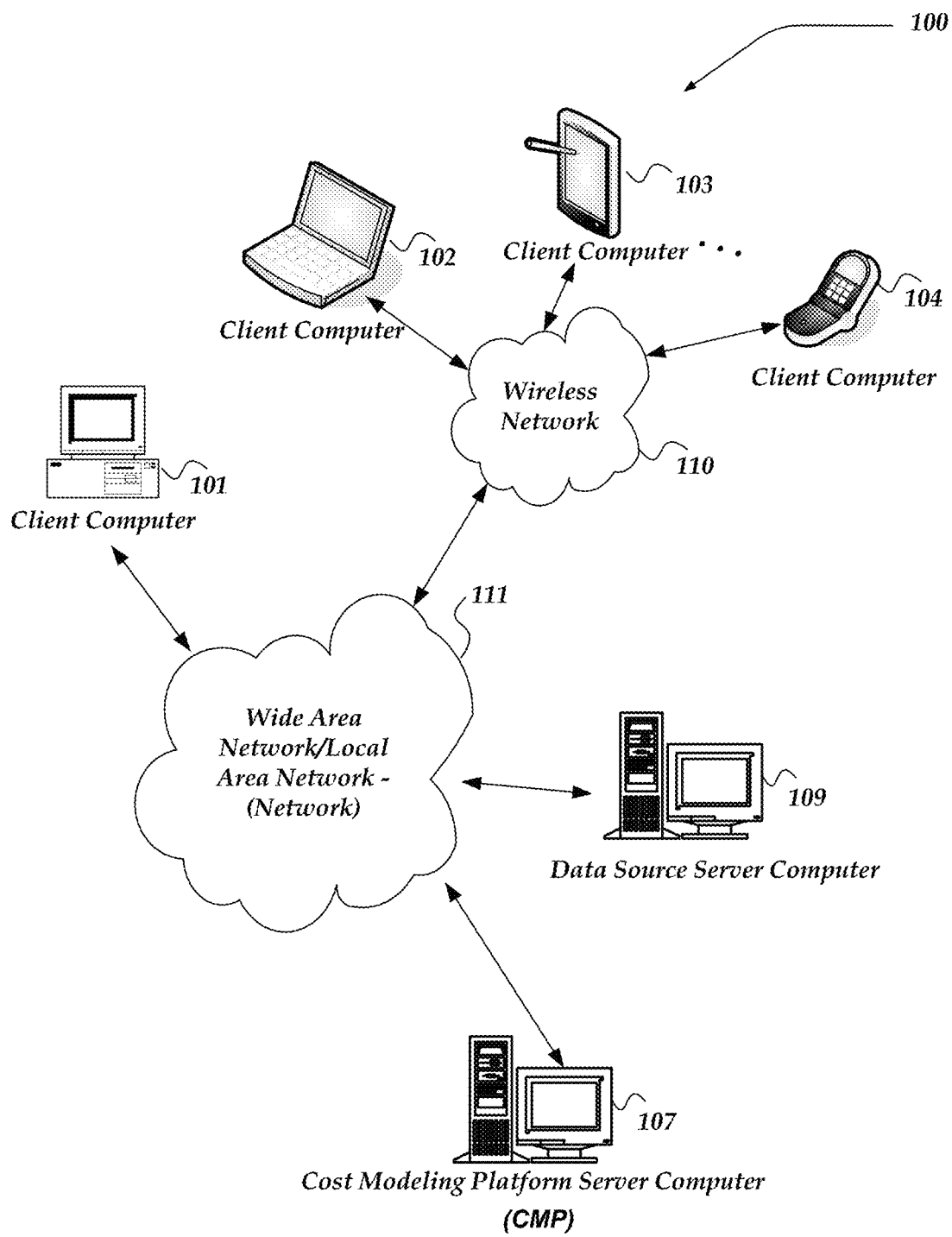
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "model line item," refers to a single line item in a data model and its associated characteristics, including resources, costs, expenses, or the like. For example, the costs associated with a particular computer that is an email server may be represent by a single model line item having a particular cost (e.g., the email server may correspond to a model line item).

As used herein, the term "category," or "model object" refers to a set and/or class of model line items that may be grouped together. Also, dataset information may be mapped to one or more categories by a cost modeling engine. For example, a collection of computers performing services such as email, web serving, enterprise resource planning, may represent separate model line items and they may be grouped into the Servers category and/or Servers Object.

As used herein, the terms "allocation rules," "entity propagation rules," or "propagation rules" refer to rules in the financial data model that determine how the costs/expenses from a category are apportioned between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category/object as well as the model line item level.

As used herein, the term "assignment ratios," refers to the results of applying one or more allocation rules and it is the distribution ratio of costs to model line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "source object" refers to an model object in a data model that may be providing resource values (e.g., costs/expenses) that may be allocated to one or more other model objects (target objects). In at least one of the various embodiments, source objects may be used to represent one or more categories in a data model.

As used herein, the term "target object" refers to an object in a data model that may be allocated values (e.g., costs/expenses) from one or more other objects (source objects). In at least one of the various embodiments, target objects may be used to represent one or more categories in a data model.

As used herein, the term "model object" refers to items that comprises a given data model. The model objects comprising data models may also be considered categories in financial allocation models, cost models, or the like. Also, in some embodiments, model objects may be considered towers or sub-towers of cost models.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards for managing data models, including resource allocation forecasting. In at least one of the various embodiments, a main data model that includes one or more resource values, one or more model objects, or the like, may be provided. In at least one of the various embodiments, a cloned data model that may be based on the main data model may be provided. In at least one of the various embodiments, providing the cloned data model, may include: providing access to the one or model objects and the one or more resource values; and if the cloned data model versions of the one or model objects and the one or more resources may be modified by the user, copying data associated with the one or model objects and the one or more resources to the cloned data model.

In at least one of the various embodiments, if a user modifies one or more resource values in the cloned data model, various actions may be performed.

In at least one of the various embodiments, a delta ratio value based on a difference between the one or more modified cloned resource values and their corresponding original resource values in the main data model may be provided. In at least one of the various embodiments, one or more line items from the cloned data model may be provided such that each of the provided cloned line items may be associated with the one or more modified cloned resource values. In at least one of the various embodiments, providing the one or more line items from the cloned data model my include traversing the cloned data model to identify the one or more cloned model objects that may be allocated at least a portion of resources associated with the modified resource values.

In at least one of the various embodiments, each of the one or more cloned line items may be modified based on the delta ratio value. In at least one of the various embodiments, modifying each of the one or more cloned line items based on the delta ratio value may include modifying at least one cloned resource value by multiplying it by the delta ratio value. In at least one of the various embodiments, one or more modified cloned line items may be stored in the cloned data model.

In at least one of the various embodiments, reports including report information based on the cloned data model may be provided. Where the report information may indicate one or more changes were made to one or more other cloned resource values such that the one or more changes may be based on the modification of the one or more cloned resource values.

In at least one of the various embodiments, if data for the one or more modified cloned resource values is absent from the cloned data model, one or more line items from the main data model may be copied to the cloned data model such that the copied line items may be associated with at least one model object that may be associated with the one or more modified cloned resource values.

In at least one of the various embodiments, one or more scenarios may be provide. In some embodiments scenarios may include one or more constraints, including restricting the one or more other cloned resource values from being modified, restricting a range of modification values for the one or more cloned resource values, or restricting data types for the one or more cloned resource values.

In at least one of the various embodiments, one or more lines from one or more cloned assignment ratio tables from the cloned data model may be provide such that each of the provided lines may associated with the one or more modified cloned resource values. And, each of the one or more lines may be modified based on the delta ratio value.

In at least one of the various embodiments, at least a portion of the one or more resource values may be cached in the main data model when network communication is unavailable. The cached resource values may be provided to the cloned data model when network communication is available.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")–(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HS- DPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
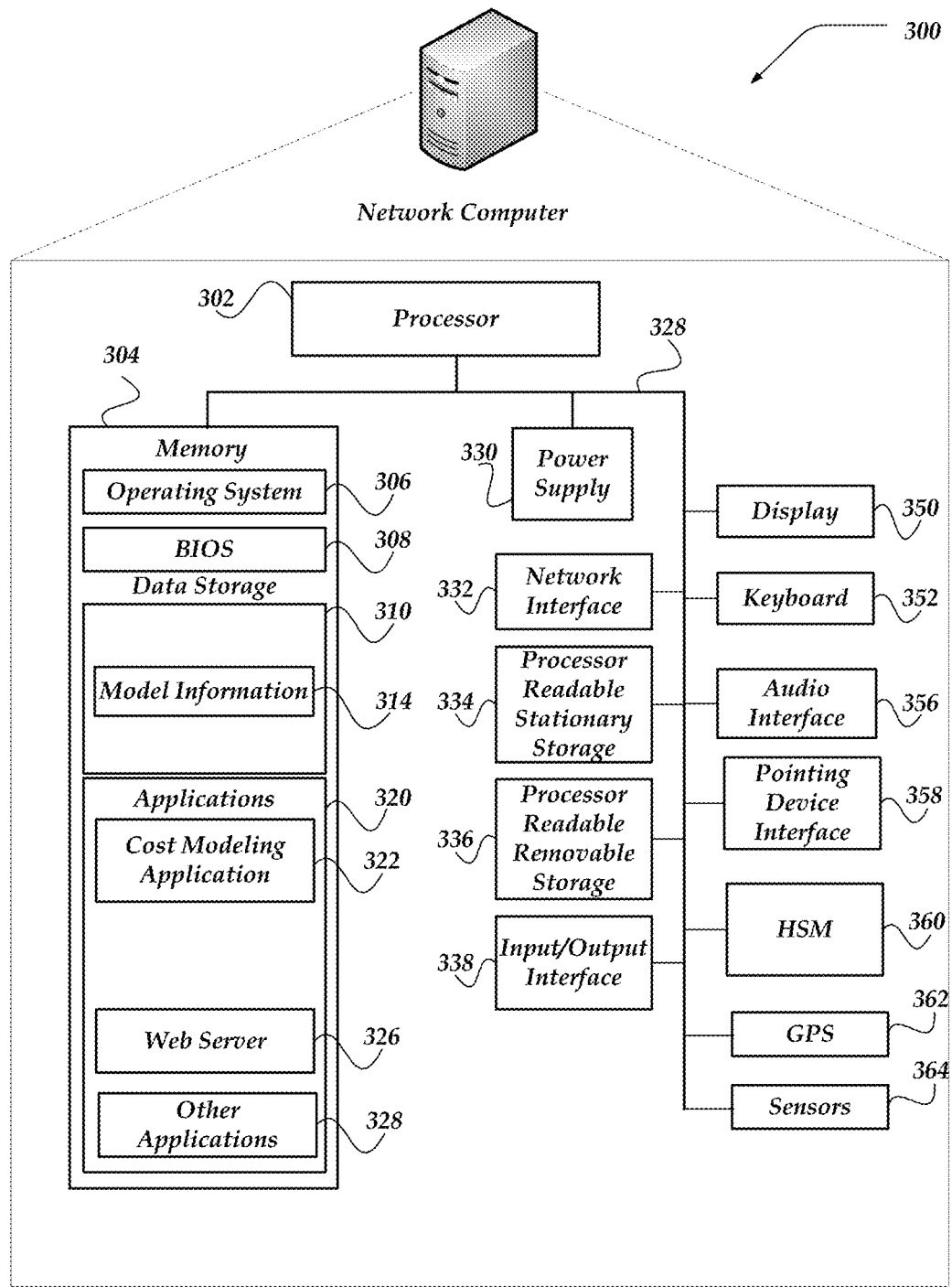
FIG. 3 illustrates one embodiment of a network computer that may be included in a system.

CMP 107 may include virtually any network computer usable to perform data processing operation that may be used for generating cost models, data models, allocation rules, recursive allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, recursive allocation rules or the like. Furthermore, CMP 107 may include and/or generate data processing applications for visualizing the generated allocation categories, cost allocations, budgets, cost models, data models, allocation rules, recursive allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform at least some of its actions.

Illustrative Client Computer

Figure 2:
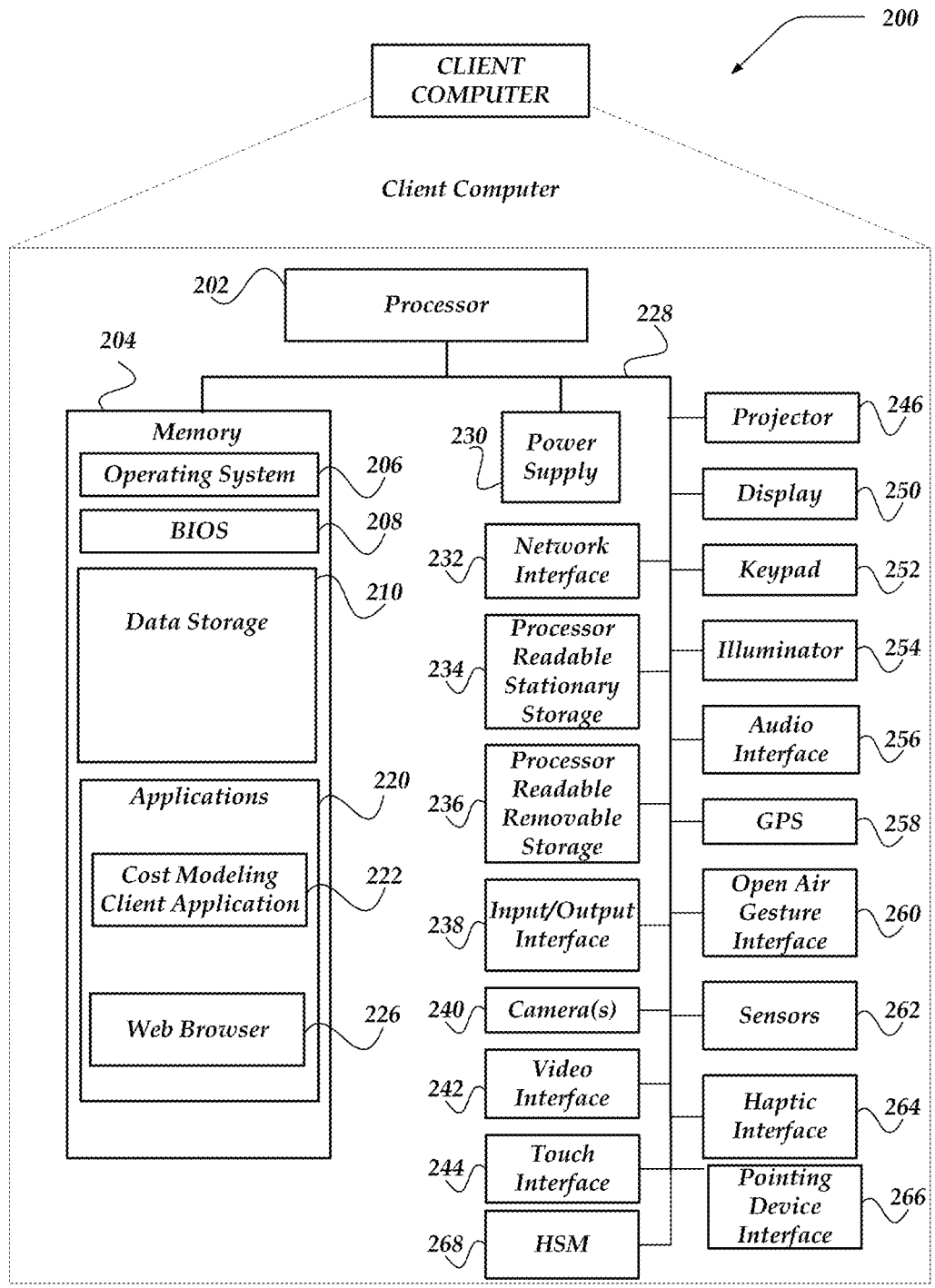
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, cost modeling client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, cost modeling client application 222. In at least one of the various embodiments, cost modeling client application 222 may be used to exchange communications to and from cost modeling platform server computer 107, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data model information 314, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geo-location protocols over the networks, such as, wireless network 108 and/or network 111.

Furthermore, in at least one of the various embodiments, cost modeling application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to cost modeling application 322 may be provisioned and de-commissioned automatically.

Also, in at least one of the various embodiments, cost modeling application 322, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, data models, cost models, total cost values for offerings, reports, what-if-analysis, or the like. Also in at least one of the various embodiments, cost modeling application 322 may employ processes, or parts of processes, similar to those described below.

Illustrative Logical System Architecture

Figure 4:
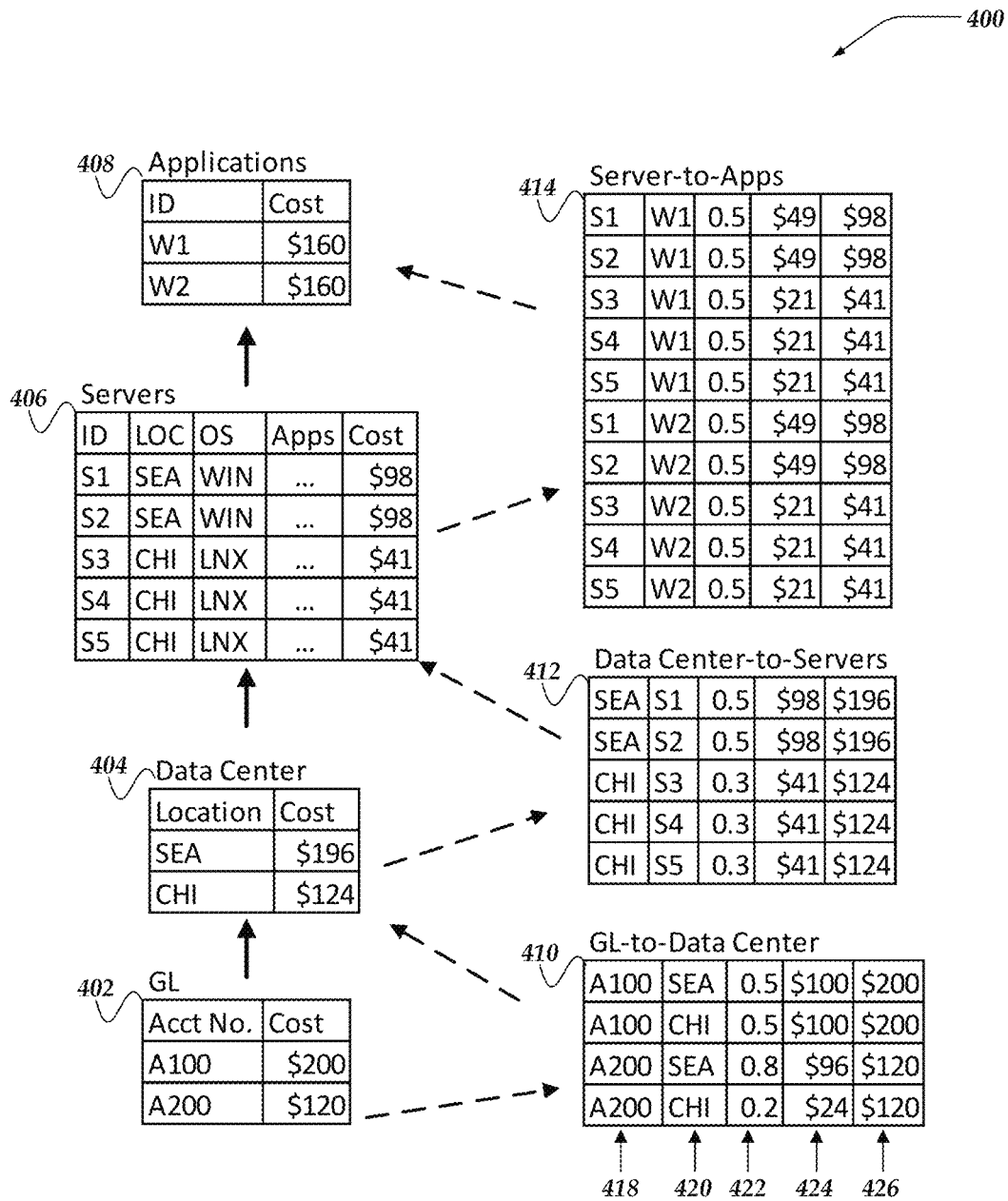
FIG. 4 illustrates a portion of a logical architecture for a data model that illustrates how resources may be allocated in a data model in accordance with at least one of the various embodiments.

FIG. 4 illustrates a portion of a logical architecture for data model 400 that illustrates how resources may be allocated in a data model in accordance with at least one of the various embodiments. Data model 400 is an example of a data model that may be arranged to model how resources, such as, money flow through a system and/or organization. Data model 400 is a simplified example that it used to describe some the concepts of the innovations included herein. One of ordinary skill in the art will appreciate that in practice data models may include hundreds or thousands of model objects each having up millions of model items. For example, data model 400 includes a GL (general ledger) object, GL object 402. In this example, GL object 402 is shown as having two accounts, account A100 and account A200. It will be well-known that in production environments there may be many more accounts in a business's General Ledger. Likewise, servers object 406 is shown as having five servers. However, in production environments, a servers object may represent thousands of servers. Furthermore, model objects used in production environments may have more and/or different columns depending on the configuration of the data model and the dataset used to generate the data model. Nevertheless, while data model 400 is a simplified representation of a data model it is sufficient to enable of one ordinary skill in the art to understand and practice the innovations included herein.

In this example, data model 400 may be arranged to include GL object 402, data center object 404, servers object 406, and applications object 408. The objects in the data model represent how money from GL object 402 may be distributed through a business system. Further, assignment ratio tables, such as, assignment ratio table 410, 412, and 414 may be defined to control how money may be distributed from one model object to another, Assignment ratio tables may be arranged to include allocation rules describing how resources flow from one model object in a data model to another.

In this example, data model 400 includes an assignment ratio table (assignment ratio table 410) to allocate money from GL object 402 to data center object 404. Also, in this example, data model 400 includes an assignment ratio table (assignment ratio table 412) to allocate money from data center object 404 to servers object 406. And, in this example, data model 400 includes an assignment ratio table (assignment ratio table 414) to allocate money from servers object 406 to applications object 406.

In at least one of the various embodiments, the details of how costs may be allocated from one object in the model to another may be encapsulated in one or more allocation rules. In at least one of the various embodiments, allocation rules may generate one or more assignment ratio tables that describe how cost values flow between the modeled objects. For data model 400, allocation rules may be described and illustrated in the form of assignment ratio tables 410, 412, and 414. In some embodiments, the allocation rules may define how an assignment ratio table may be arranged.

In at least one of the various embodiments, an assignment ratio table may be arranged to include one or more columns of information, such as, source object line item 418, target object line item 420, assignment ratio 422, allocation value 424, source value 426, or the like. In this example, the entries in the source object line item column 418 correspond to the line items in GL object 402. Namely, A100 and A200 (e.g., representing account names from a chart-of-accounts). Also, the entries in target object line item column 420 correspond to the line items comprising data center object 404 (e.g., SEA for Seattle and CHI for Chicago). The next column, assignment ratio column 422, contains a value for computing how much money flows from the source object line item to the target object line item. In at least one of the various embodiments, the value may be the percentage a resources being rolled up from the source object. In some embodiments, an allocation rule would be arranged to define how the mapping occurs between the source object and the target object, and from these values a ratio value may be computed. This ratio value may be applied to the resource value of the source object (e.g., cost) to determine the percentage of the resource that is provided to the target object.

In this example, an allocation rule corresponding to assignment ratio table 410 causes the money from A100 to be evenly divided between location SEA and location CHI. Likewise, 80% (0.8) of the money from A200 is allocated to location SEA and 20% (0.2) is allocated to location CHI. Column 424 in assignment ratio table 410 shows the amount of money that flows from the source object line item to the target item. And column 426 shows the amount of money that the source object line item starts with. For example, based on GL object 402, A100 starts with $200 and A200 starts with $120. Thus, since the assignment ratio for A200 is 80% to location SEA, the line item for SEA is allocated $96 (approximately 80% of $120) while location CHI is allocated $24 (approximately 20% of $120). Likewise, since, in this example, A100 is evenly split with allocation ratio 50% or 0.5 between location SEA and location CHI, each location is allocated $100. In at least one of the various embodiments, the values in data center object 404 reflect the application of the allocation rules corresponding to assignment ratio table 410. Similarly, the remaining objects in model 400 may be allocated costs based on their respective allocation rules and corresponding assignment ratio tables.

In at least one of the various embodiments, the underlying reason for employing a particular allocation rule may depend on the objects that are being modeled. For example, in model 400, account A100 is modeled as a line item in GL object 402 and it may represent the costs/money allocated to operating a Seattle based data center. And A200, also modeled as a line item in GL object 402, may represent the costs/money allocated to operating a Chicago based data center.

Likewise, in this example, referring to assignment ratio table 412, money is allocated from to the servers items. In this example, money allocated to the Seattle data center (SEA in data center object 404) is split between two servers, S1 and S2, while money allocated to the Chicago (CHI) data center is split between three servers (e.g., S3, S4, S5).

Finally, data model 400 models how money is allocated from servers object 406 to applications represented by application object 408. In this case, assignment ratio table 414 shows that the costs allocated to each server are evenly allocated to application W1 and application W2. For examples, the first line of assignment ratio table 414 shows that half of the costs of server S1 ($49) are allocated to application W1 with the other half of the costs of server S1 ($49) are allocated to application W2. Similarly, the costs associated with the other servers (S2-S5) are split between application W1 and W2.

Accordingly, in at least one of the various embodiments, data models, such as, data model 400 enable reports to be generated that answer various questions about how resources are allocated throughout the modeled business system. For example, data model 400 shows that the $320 that entered the system through GL object 402 is split evenly between applications W1 and W2.

Likewise, data model 400 easily answers questions, such as, how much money is allocated to each server located in Seattle? The answer of $98 for each server is readily derived from servers object 406. Generally, models such as data model may enable detailed reporting on how money (or other resources) flow between object that are adjacent in the data models. Reports such as tracing the costs from one object to another may be efficiently generated as long as there are no intervening objects in the model.

One of ordinary skill in the art will appreciate that model objects and tables such as those described above may be arranged to have more or fewer features, columns, rows, or the like. Likewise, data models may be arranged in different geometries and have more (many more) or fewer model objects depending on the application and/or the business system being modeled. Also, data models may be arranged to model the allocation of different resources, such as, financial resources (money), energy, water, power, or the like, among different parts of an enterprise or organization.

In at least one of the various embodiments, line items for the various data model objects may be generated based on actual datasets for the business/system that may be represented by a data model. In this example, GL object 402 has line items that correspond to accounts in a business's GL ledger. Data center object 404 includes line items that represent each data center; servers object 406 includes line items that represent each server computer in the organization.

FIG. 5 illustrates a logical representation of allocation ratio table 500 showing a drill-down view of resource value allocation in accordance with at least one of the various embodiments. Data model 400 as shown in FIG. 4 include assignment ratio (AR) tables, such as, AR table 412 that show how resources may be allocated up the data model. However, in at least one of the various embodiments, a data model may be required to generate drill-down reports that show where the resource allocated to a model object come from. For example, in FIG. 4, it is easy to see from application object 408 that application W1 consumes (is allocated) $160 and that application W2 consumes $160. However, from the data model shown in FIG. 4 it is unclear how much of resources allocated to application W1 is provided from the costs associated with a given data center or server. Accordingly, in at least one of the various embodiments, data models may be arranged to include drill-down AR table that are arranged to show where the resources allocated to an model object may come from.

In this example, for at least one of the various embodiments, AT table 500 includes five columns. Column 502 represents applications, column 504 represents servers, column 506 represents data centers, and column 508 shows that allocation ratio for a line item, and column 510 shows cost line items.

Accordingly, from AR table 500, the resources from each application that are sourced from particular data center may be determined, as shown in table 512. Thus, it is clear in this example, that of the total resources allocated to application W1, $63 comes from the Chicago Data Center and $98 is from the Seattle Data Center. Since the drill-down AR tables are generated from the model after the allocation information is computed for the model, changes to model items resource values and/or allocations must be fully computer and from there a drill-down AR may be computed. However, in production environments that have dozens of data centers, thousands of servers, and possible 100's of applications, changing model values to observe the impact of the change may be computationally expensive and/or prohibitive since the AR tables and the drill-down AR table will have to be recomputed to reflect edits made to resource values in the model object line items.

In at least one of the various embodiments, the high computation expense associated with re-computing the AR tables for a data model may discourage analysis using what-if scenarios since generating the results (AR tables and reports) for different scenarios may be time consuming and expensive.

FIG. 6A-6C illustrate logical examples of embodiments for performing what-if analysis for a data model that does not require extensive/expensive recalculations to generate updated allocation ratio (AR) table.

FIG. 6A illustrates a logical represent of table 600 that illustrates determining what-if delta values that may be used to provide accelerated what-if analysis in exchange for a loss of some accuracy and/or precision in accordance with at least one of the various embodiments.

In this example, table 600 includes information for a what-if scenario that examines the impact of changing the cost of a data center. For example, a user may want to use data model 400 and analyze the potential impact to costs of the cost/expense of a data center may be reduced. In this example, if user is considering a moving to a lower-cost data center vendor, the user may be interested performing a what-if analysis for the data model to see how the cost reduction associated with a change in data center vendors may impact the costs for the applications (referring to data model 400).

In at least one of the various embodiments, table 600 representing using data structure 602, includes various columns, such as, column 604 representing a data center's location/name, column 606 representing the actual (current unmodified) cost of the data center, column 608 representing a what-if value, column 610 represent the difference (delta) between the action cost and the what-if cost, and column 612 that shows a ratio of the difference cost and the actual cost.

In at least one of the various embodiments, line 614 shows a what-if scenario for analysis of the cost of the Seattle data center is reduced from $196 to $147 (25% reduction). Before implementing a change to a less expensive data center the user may want to perform cost impact analysis using one or more data models. However, since re-computing the data model and its AR tables may be prohibitively expensive and/or slow, the user may employ one or more of the various embodiments to reduce the time and expense of regenerating the data model and its AR tables.

Accordingly, in at least one of the various embodiments, a cost modeling application, such as, cost modeling application 322 may be arranged to accept one or more edits to model object line items and/or AR tables and apply them directly to the relevant existing AR tables rather than computing the AR tables using the new edits.

For example, table 600 shows that a user is changing the cost value associated with the Seattle data center from $196 to $147. Accordingly, the user would like to see how this change impacts the business by applying to a data model, such as, data model 400. In this example, the change is that is being analyzed is a $49 (25%) cost reduction. Accordingly, based on these values the user may be enabled to analyze whether it makes business sense to switch to the new vendor. In some embodiments, other one-time costs, such as, switch over expenses, training expenses, or the like, may be considered if analyzing the potential return-on-investment that may be associated with a change to (in this example) a new data center vendor.

In at least one of the various embodiments, rather than re-computing the AR tables, cost modeling application 322 may be arranged to apply the delta ratio to each relevant line item (including AR line) that may be impacted by the edits. Accordingly, in some embodiments, resource values for the relevant line items may be recomputed directly based on the delta ratio.

FIG. 6B illustrates, in this example, for some embodiments, data model portion 616 that shows how the change in data center costs may affect the servers represented by modified server object 618 in accordance with at least one of the various embodiments. In this example, the difference between servers object 406 and servers object 618 is column 620 that holds a what-if value. In some embodiments, the what-if column may simply be a cost column holding the what-if value. Here, the what-if column is shown as an additional column for clarity.

In this example, the what-if scenario is testing the effects of reducing the costs of the Seattle data center by changing data center vendors. Accordingly, the cost of servers in Seattle may be impacted. To show this potential impact, the costs of the servers in Seattle may be reduced based on the delta ratio for the proposed change in the cost. As seen in this example, the change in cost at the Seattle data center may be a 25% reduction. Accordingly, the costs attributed to servers in Seattle may be reduced by 25%. Note, that under non-what-if operations (prior art) the AR table illustrating how resources are allocated from the data centers to servers would be completely recomputed. In contrast, in some embodiments, the delta ratio is directly applied to the values.

Accordingly, in this example, line item 622 shows that for server S1 the cost would be $73.50 instead of $98. Likewise, line item 624 shows that for server S2 the cost would be $73.50 instead of $98. Note, in this example, servers S3, S4, and S5 are not impacted since they are not in a Seattle data center so changing the cost in Seattle does not influence them.

Further, in this example, data center object 626 illustrates the what-if scenario, showing the reduced cost of the Seattle data center (line item 630) and that the Chicago data center what-if cost is the same as its normal/original cost.

In at least one of the various embodiments, line item resource values may be computed for a what-if scenario by simply applying the delta ratio(s) directly to the resource values rather than re-running allocation rules and/or re-generating AR tables.

In at least one of the various embodiments, a what-if scenario may be projected out a number of months or years to enable users to analyze the long impact/return of their proposed changes. For example, a user may want to know how a change done this month will affect the business two years from now; to do that, the cost modeling application may be arranged to associate a projected growth rate, copy-forward data from this month, applying that growth rate and/or the what-if scenarios for each projected time period (e.g., month, year, or the like). For example, the model may generation projections that predict that over the next 5 years, the business may grow its headcount at 10%; grow its on-premise servers at −5%; and grow its cloud servers at 15%. The resource allocation forecasting based on the actual data model enable the user to examine how the business will look like if the proposed changes are made today.

In at least one of the various embodiments, a cost modeling application may be arranged to create a cloned data model based on the main data model. A cloned data model may be instantiated such that the contents of model objects (e.g., line items) and/or AR table are not copied or duplicated unless they are going to be modified as part of a what-if scenario. In at least one of the various embodiments, thus a cloned data model may be quickly and inexpensively created since only a fraction of its data needs to be duplicated.

In at least one of the various embodiments, the forecasting method described may not be as accurate and/or precise as running a full recalculation of the data model, it does provide an estimated value that may be sufficient for determining if the scenario merits further exploration and/or analysis. Also, in some embodiments, cost modeling application may be arranged to enable multiple cloned data model that are cloned from the same data model. Thus, in some embodiments, different what-if scenarios may be compared side-by-side without impacting the main data model.

FIG. 6C illustrates, for this example, data model portion 630 that shows how the change to line items in what-if scenarios may be accommodated in the forecasting model in accordance with at least one of the various embodiments. For this example, in some embodiments, servers object 632 may include five server line items (individual servers). Servers object 632 includes five servers running the Linux operating system (OS). These servers are named A, B, C, D, and E and they are running applications App1, App2, App3, App4, and App5 respectively as shown in servers object 632. Also, servers object 632 shows that for this example, the total cost of servers is $500 ($100×5).

In at least one of the various embodiments, a user may design a what-if scenario that increases or reduces the number of the line items, in such cases, the cloned data model may lose some granularity with respect to how the individual line items are represented. For example, object 636 may be a cloned data object in the cloned data model is part of a what-if scenario that loses granularity.

In this example, the what-if scenario in the cloned data model may represent a change from five servers to four servers. In this example, the what-if change may enable a cost reduction of $100. However, object 636 is now unable to represent the individual servers because one or more servers has been removed and one or more servers have been added. The 'new' servers are not shown individually because the "what-if" servers do not have hostnames, and so on. Also, the removed servers cannot be individually shown because they effectively have a cost of zero in the cloned data model which does not realistically represent the what-if scenario. Accordingly, in this example, servers object 636 may be arranged to group the servers based on their operating system—giving up granularity that was available in the main data model to support the what-if scenario. Thus, in this example, column 638, representing the hostnames of the server items, is represented as {various} indicating that one or more hostnames are represented by the field.

Accordingly, in at least one of the various embodiments, a cost modeling application, such as, cost modeling application 322 may be arranged generate collapsed objects that lose some granularity to provide the flexibility needed for some what-if scenarios. In some embodiments, the cost modeling application may determine how to group/collapse the objects based on the allocation rules that link them together. For example, in this example, the allocation rule may distribute costs based on operating systems and/or applications so collapsing the servers object to group by the operating system and/or application (losing the hostname information) may occur without disrupting the overall model.

In at least one of the various embodiments, cost modeling application 322 may be arranged to take into account other allocation rules properties such as minimum costs, maximum costs, tiered costs, or the like, or combination thereof. In some embodiments, adding or removing line items may not always cause an increase or decrease in consumed resources. Accordingly, cost modeling application 322 may be arranged to apply these types of properties to the cloned data model for forecasting. For example, if a data center that can hold a maximum of 3000 servers costs $50,000, it will cost $50,000 irrespective of whether there is one server or 3,000 servers. Thus, for example, it will cost $50,000 for 1-3000 servers. E.g., a reduction from 2500 servers to 2000 server will not reduce the cost of the data center. Likewise, in this example, an increase from 2500 servers to 3000 servers will not increase the cost for data centers. However, in this example, an increase from 3000 servers to 3100 servers would double the cost of data centers because an additional data center would be required for the servers that exceed the capacity of the first data center.

Accordingly, in at least one of the various embodiments, cost modelling application 322 may be arranged to interpret the allocation rules of the main data model to determine if the costs are tiered or stepped. In at least one of the various embodiments, cost modeling application 322 may forecast the impact of what-if scenarios by applying the tiered cost increases/decreases that may be triggered by adding or removing related line items.

Figure 7:
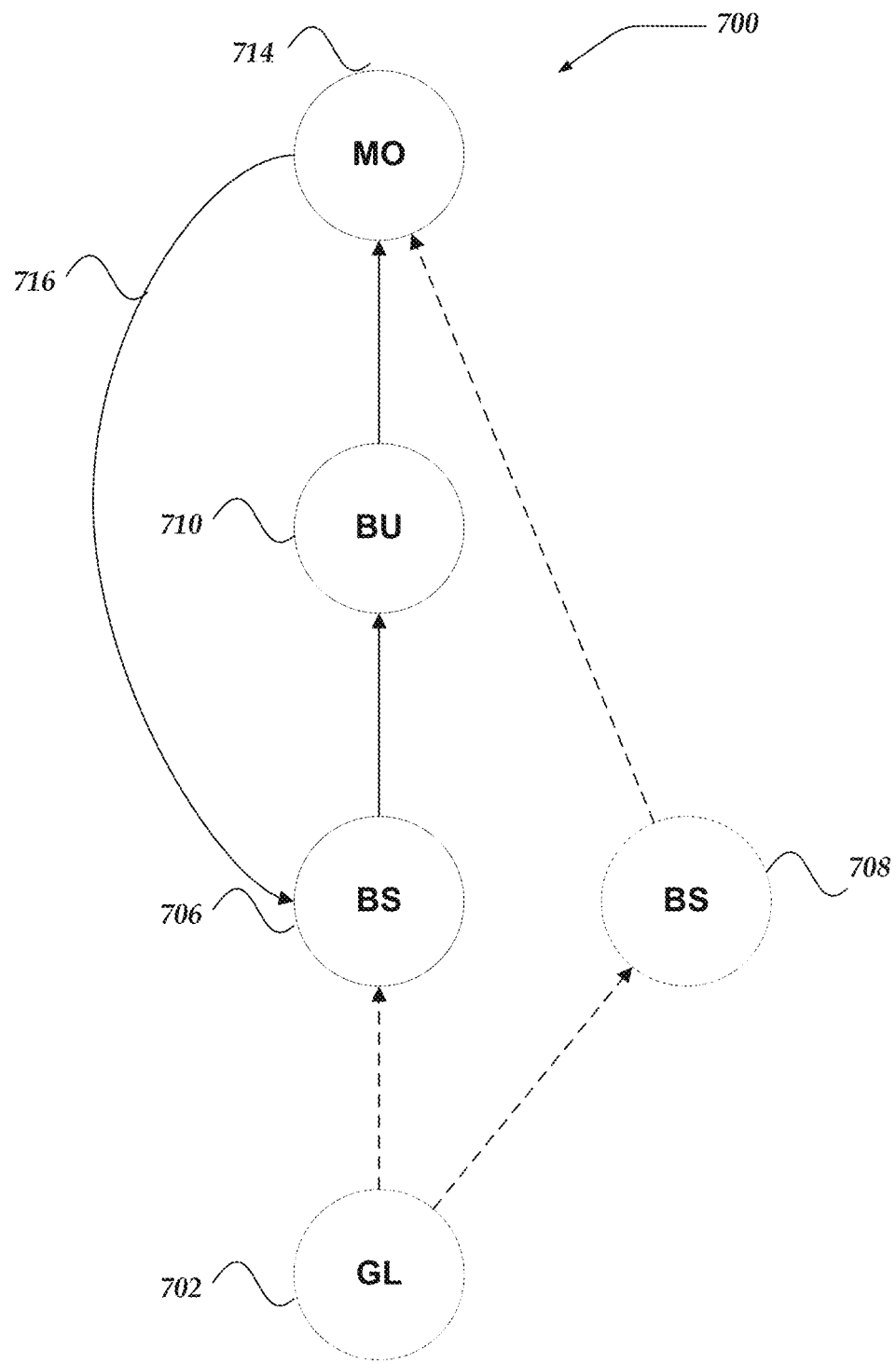
FIG. 7 shows a portion of a data model in accordance with at least one of the various embodiments.

Also, in at least one of the various embodiments, the main data model may define limits/thresholds based on various properties of an object. For example, the cost tiers for a data center object may be associated with: the number of server seats per data center; the energy/power that the data center consumes; or the like, or combination thereof. FIG. 7 shows a portion of data model 700 in accordance with at least one of the various embodiments. In at least one of the various embodiments, as mentioned above, data models may be arranged to model how costs may be allocated to different objects (e.g., categories) that are part of a business system. Data model 700 represents a segment of a data model that models the allocation of costs from cost source object 702. In this model, cost source object 702 allocates costs to business service object 706. Next, in at least one of the various embodiments, data model 700 shows that the costs may be further allocated from business service unit 706 to business unit object 710. And, in at least one of the various embodiments, the costs from business unit object 710 may be allocated to model object 714. Note, for this example, model object 714 simply represents the boundary of this model segment. Thus, in at least one of the various embodiments, it may be a terminating node, a business service object, a business unit object, or the like.

In at least one of the various embodiments, cost object 702 may be a representation of a General Ledger (GL), dataset data, or the like. In some embodiments, business service object 706 may be representative of an internal business service such as storage, servers, or the like. Likewise, business unit object 710 may be representative of a business unit such as a sales department, marketing department, engineering department, or the like. And, in at least one of the various embodiments, model object 714 may be representative of any other object that may be in a business system model and/or a cost data model. For example, model object 714 may be a product or service the offered by the modeled business system, another business service, business unit, or the like. Here, it simply represents that the model may continue or terminate depending on the system being modeled.

In at least one of the various embodiments, the details of how costs may be allocated from one object in the model to another may be encapsulated in one or more allocation rules. Allocation rules describe how cost values flow between the modeled objects. In at least one of the various embodiments, the lines between the objects represent allocation rules and their associated AR tables (not shown). One of ordinary skill in the art will appreciate that allocation rules and production data models may include arbitrarily complex allocation rules that may include arbitrarily complex formulas to map costs and/or values between model objects. However, data model 700 is sufficient to at least describe, enable, and disclose at least the innovations contained in this application. Further, in data model 700, business service object 706 may be considered to be a source object and business unit object 710 may be considered its target object. With allocation rules directing how values flows from the source object to the target object.

In at least one of the various embodiments, portions of data model 700 may be selected for resource allocation forecasting using one or more what-if scenarios. Accordingly, for the purposes of this description, data model 700 may be considered a cloned data model generated from a main data model. Cloned data model 700 may include logical instantiations of the model objects of the main data model, however, the data may remain unduplicated until it is necessary to copy the data.

In this example, if a what-if scenario includes modification to business server object 706, data for business server object 706, business unit object 710 and model object 714, data associated with those object may be duplicated. Data that may be associated with GL object 702, allocation rule 704, and business service object 708 may be considered (in this example) unaffected by the what-if scenario. Thus, in this example, the data for these objects, including model object line items, AR tables, or the like, may be referenced from the main data model (not shown) rather than duplicated.

Further, in at least one of the various embodiments, a cost modeling application may be arranged to trace/traverse the data model to determine which model objects and pre-existing AR tables (if any) may be impacted by a what-if scenario. Accordingly, the cost modeling application may trace the model object and/or AR tables based on the connections between the model objects that comprise the data model.

In this example, a what-if scenario that effects business service object 706 may impact business unit object 710, and model object 714 as well as their AR tables, including drill-down tables (represented by line 716).

In at least one of the various embodiments, a cost modeling application may be arranged to cache at least a portion of the one or more resource values in the main data model when network communication is unavailable. Accordingly, in some embodiments, if network communication becomes available, the cached resource values may be provided to the cloned data model when network communication is available. Also, in at least one of the various embodiments, the cloned data model may be arranged operate separate from the main data model if network communication becomes unavailable. Accordingly, in some embodiments, if network communication becomes available data from the main data model may be copied to the cloned data model as necessary. Likewise, in at least one of the various embodiments, the cost modeling application may be arranged to notify a user that changes to a cloned data model require data from the main data model.

Accordingly, in at least one of the various embodiments, if the network communication is unavailable, the cost modeling application may be arranged to notify the user that access to a separate main data model has been restored.

Generalized Operations

FIGS. 8-11 represent the generalized operations for resource allocation forecasting in accordance with at least one of the various embodiments. In at least one of the various embodiments, processes 800, 900, 1000, and 1100 described in conjunction with FIGS. 8-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 8-11 may be operative in cost modeling and resource allocation forecasting architectures such as those described in conjunction with FIGS. 4-7.

Figure 8:
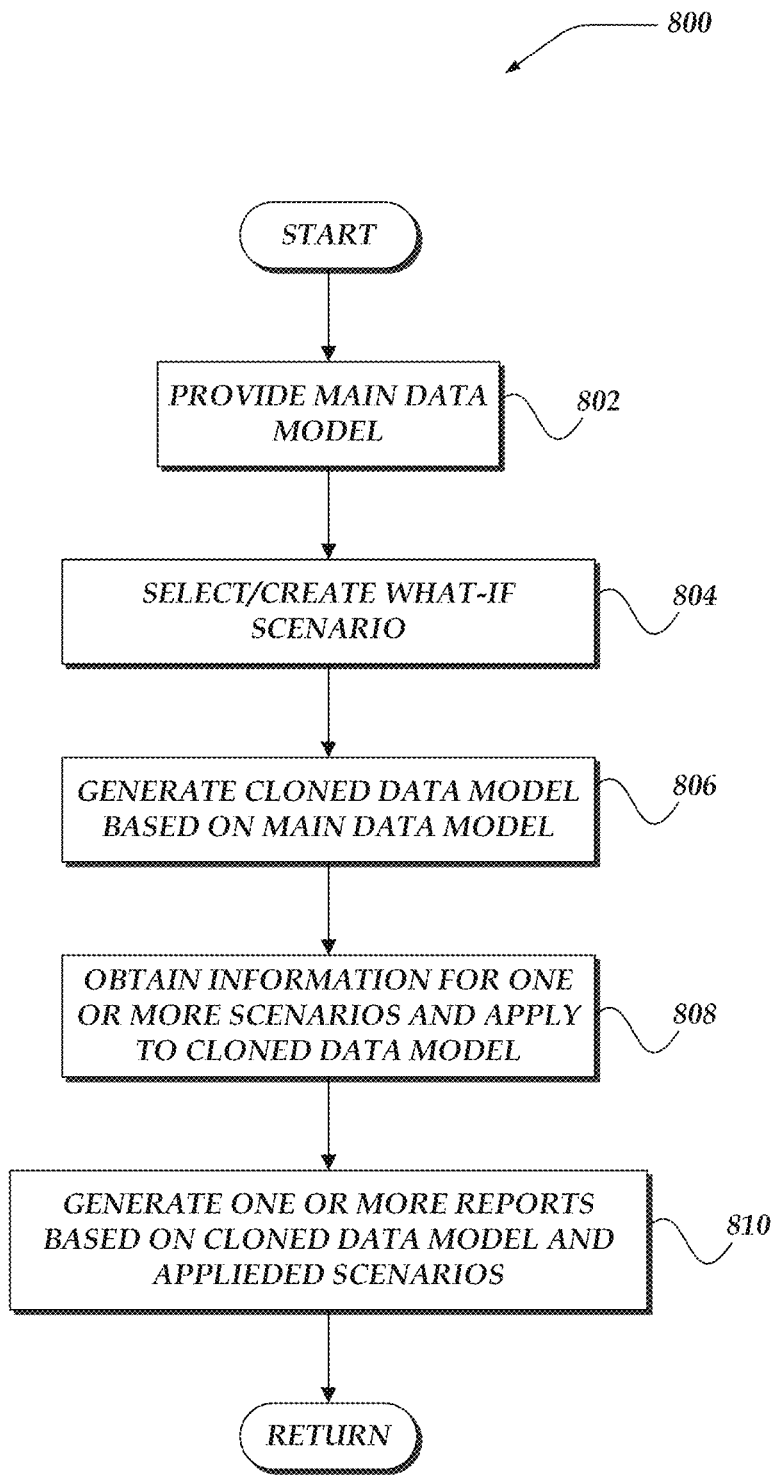
FIG. 8 illustrates a flowchart for a process for resource allocation forecasting in accordance with at least one of the various embodiments.

FIG. 8 illustrates a flowchart for process 800 for resource allocation forecasting in accordance with at least one of the various embodiments. After a start block, at block 802, in at least one of the various embodiments, a main data model may be provided. In at least one of the various embodiments, a user-interface may be arranged to enable a user to select a main data model from among one or more available data models.

At block 804, in at least one of the various embodiments, a scenario may be selected or created by a user. In at least one of the various embodiments, a cost modeling application and/or cost modeling client application may be arranged to provide a user-interface that enables a user to select from one or more existing what-if scenarios. Also, in some embodiments, a user-interface may be provided that enable users to create a new what-if scenario. Scenarios may include configuration that may define one or more model objects that may be included in the scenario. Likewise, in some embodiments, scenarios may be arranged to define one or more resource value, allocation ratios, or the like, that may be modified as part of the what-if scenario that is being modeled. In some cases, scenarios may include constraints that restrict one or more value from being modified and/or the range of values and/or data types.

In at least one of the various embodiments, a scenario may be open ended in that it enables a user to edit/modifying some or all of the features of a data model. Also, in at least one of the various embodiments, scenarios and/or user made derivations of existing scenarios may be stored for future use.

At block 804, in at least one of the various embodiments, a cloned data model may be generated based on the main data model. In at least one of the various embodiments, rather duplicating the main data model, a cost modeling application may be arranged to instantiate a clone of the main data. The cloned data model may be arranged to maintain references to the model objects and AR tables of the parent main data model. In some embodiments, the cost modeling application may be arranged to instantiate a data structure that logically wraps the main model data.

In at least one of the various embodiments, if objects or data associated with the cloned data model is modified, the data for those particular object (or AR table) may be duplicated for use by the cloned data model. The links/references to the main data model objects/data may be broken when the corresponding objects are edited by way of the cloned data model.

For example, referring to FIG. 4, if data model 400 is selected as a main data model, a cloned data model may be created that includes references to the objects and data in data model 400. If the what-if scenario results in an edit to the cost of the Seattle data center in data center object 404, the reference from the cloned data model to main data model may be broken and the data center object and its data may be instantiated in the context of the cloned data model.

At block 806, in at least one of the various embodiments, information for one or more what-if scenarios may be obtained and the one or more scenarios may be applied to the cloned data model. In at least one of the various embodiments, information collected for the scenario(s) may be collected. Further, the cost modeling application may be arranged to modify the cloned data model based on the scenario edits. In at least one of the various embodiments, one or more model objects and/or AR tables in the cloned data model may be modified depending the scenario edits and/or the arrangement of the data model. Likewise, in at least one of the various embodiments, the data associated with the model objects and/or AR table that are modified as a result of the scenario edits may be duplicated and copied into the context of the cloned data model.

Also, in some embodiments, changes related to the scenario edits may be cascaded through the cloned data model based on the relationship between the model objects in the data model.

At block 808, in at least one of the various embodiments, one or more reports may be generated based on the applied scenarios and the cloned data model. In at least one of the various embodiments, reports may be generated using the cloned data model to show the impact/effect of the scenario edits. In at least one of the various embodiments, since the scenario edits are applied to the cloned data model, the main data model remains unchanged. In at least one of the various embodiments, reports may be generated response to queries regarding the cost of different line items after applying the scenario edits.

In at least one of the various embodiments, the scenario edits and reporting may be interactive. Accordingly, in at least one of the various embodiments, as a user makes edits to scenario values, the reports may automatically update to show the impacts. In at least one of the various embodiments, reports may be displayed in an interactive graphical user interface and/or provided in a printed format. Next, control may be returned to a calling process.

Figure 9:
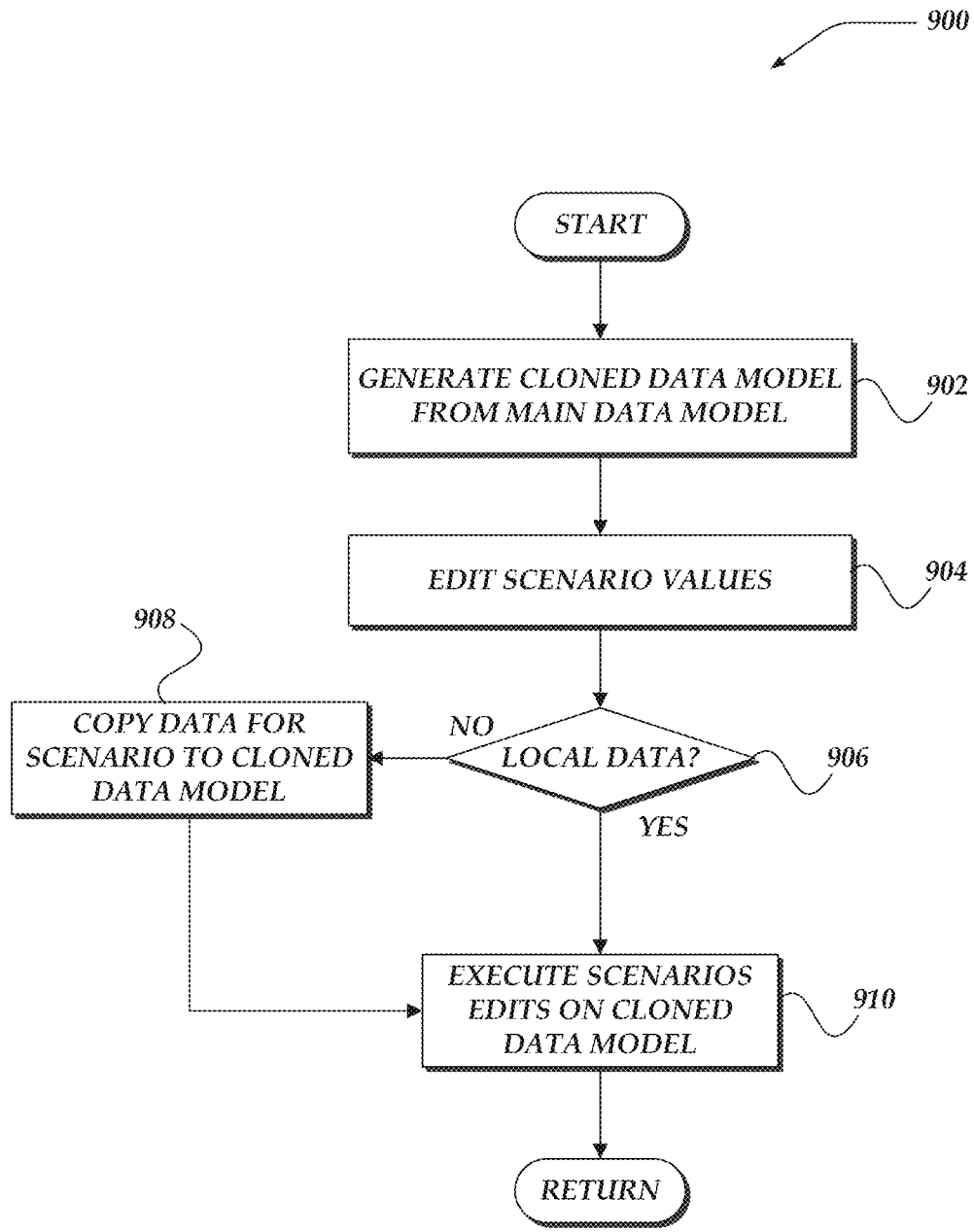
FIG. 9 illustrates a flowchart for a process for working with cloned data models in accordance with at least one of the various embodiments.

FIG. 9 illustrates a flowchart for process 900 for working with cloned data models in accordance with at least one of the various embodiments. After a start block, at block 902, in at least one of the various embodiments, a cloned data model may be generated based on a main data model. As described above, the initial cloned data model may logically reference the objects and data from the main data model. In at least one of the various embodiments, since the cloned data model initially does not have any data, it may be quickly generated without impacting performance of the rest of the system and/or consume significant computing resources.

At block 904, in at least one of the various embodiments, one or more scenario values may be edited. In some embodiments, what-if scenario values may be model object line item resource values, assignment ratio table values, or the like, or combination thereof. As described above, a cost modeling application and/or a cost modeling client application may be arranged to enable resource values associated with the cloned data model to be edited.

At decision block 906, in at least one of the various embodiments, if a local version of the data associated with the model object and/or AR table that is being editing is available, control may flow block 910; otherwise, control may flow block 908. In at least one of the various embodiments, cloned data models are initiated absent their own copies of data. Accordingly, a cost modeling application may be arranged to determine if the underlying model object data and/or AR table data has been duplicated from the main data model.

At block 908, in at least one of the various embodiments, data relevant the scenario edits may be retrieved and/or duplicated. The data may correspond to the main data model that is the source/parent of the cloned data model. In at least one of the various embodiments, the data model may be traversed to determine which model objects and/or AR tables may be impacted by the scenario edit. Also, in some embodiments, the what-if scenario may include configuration information that lists one or more model objects, AR tables, or the like, the may be included or excluded for a cloned data model. Otherwise, the cost modeling application may be arranged to traverse the data model graph to determine the data that needs to be duplicated in the cloned data model. For example, referring to data model 400 in FIG. 4, if data center object 404 is modified, a graph traversal of the model indicates that AR table 412, servers object 406, AR table 414, and application 408 may be impacted. Likewise, FIG. 7 illustrates the selective data/object duplication, where data associated with object 702 and object 708 does not need to be copied into the cloned data model.

At block 910, in at least one of the various embodiments, the one or more scenario edits may be applied to the cloned data model. In at least one of the various embodiments, scenario edits may be applied to the data associated with one or more the objects in the cloned data model. In at least one of the various embodiments, a particular scenario may include specific instruction or configuration information that defines how the scenario edit values are applied to the cloned data model. Also, in at least one of the various embodiments, the cloned data model may be scanned or traversed to determine the line items, AR table lines, or the like, that need to be modified because of the scenario edits. For example, referring again to FIG. 4, a scenario edit to the cost for the Seattle data center in data center object 404 may ripple to AR table 412, servers object 406, AR table 414 and, applications object 408. In this example, the cost modeling application may trace which items are affected by each scenario edit and perform the necessary data duplication from the main data model and/or modifications to the data in the cloned data model. Next, control may be returned to a calling process.

Figure 10:
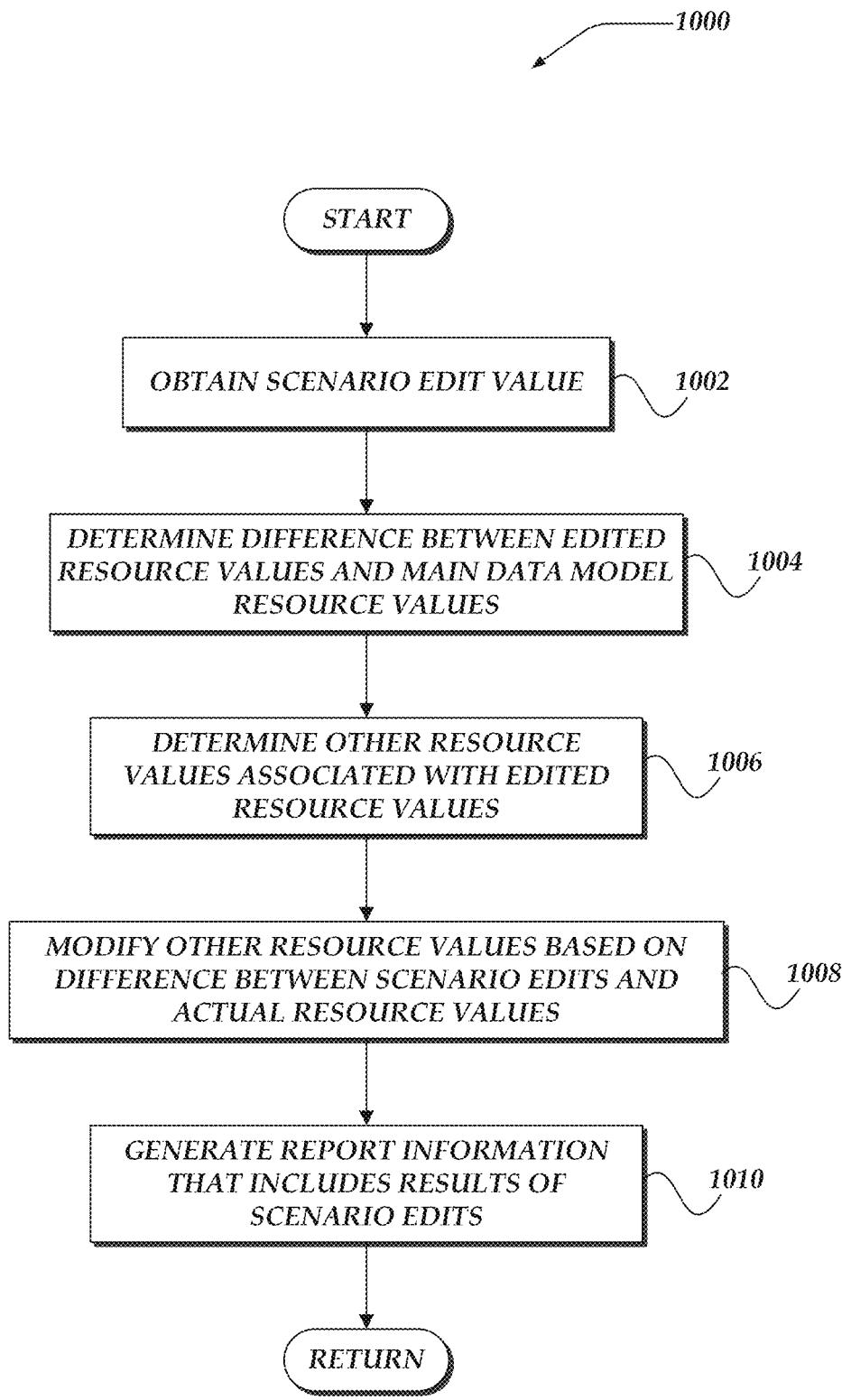
FIG. 10 illustrates a flowchart for a process for applying scenario edits in accordance with at least one of the various embodiments.

FIG. 10 illustrates a flowchart for process 1000 for applying scenario edits in accordance with at least one of the various embodiments. After a start block, at block 1002, in at least one of the various embodiments, one or more scenario edit values may be obtained. In at least one of the various embodiments, a cost modeling application and/or a cost modeling client application may be arranged to provide one or more user-interfaces that enable a user to provide values for scenarios. For example, as described in FIGS. 6A and 6B, a scenario edit may be a proposed reduction in a resource value, such as, costs, for one or more model object line items. Also, in some embodiments, scenario edits may include changes to values in an assignment ratio (AR) tables.

At block 1004, in at least one of the various embodiments, the difference (if any) between the scenario value edits and the original resource values may be determined. In at least one of the various embodiments, rather than re-compute the line item values and/or generate new AR tables based on applying the allocation rules of the model, more efficient processes may be used to update the cloned data model.

In at least one of the various embodiments, the cost modeling application may be arranged to compute the difference between the original resource values and the scenario resource values. From the difference of the two values, a ratio or percentage in change (delta value) may be determined by dividing the scenario value by the original value to obtain the percentile value that represent the increase or decrease in the scenario value as compared to the original resource value. (See, FIG. 6A.)

At block 1006, in at least one of the various embodiments, one or more other resource values that are associated with and/or otherwise, impacted by the scenario edits may be determined. In at least one of the various embodiments, the resource values that may be related to the scenario edit values may be determined by tracing (e.g., graph traversal) the data model. In at least one of the various embodiments, these determined model objects may include objects that directly or indirectly receive a portion of the resources associated with the edited scenario resource values.

Also, in at least one of the various embodiments, AR table entries/lines impacted by the scenario edits may be determined as well. For example, changes to a cost of line item in model object will impact one or more corresponding lines in one or more AR tables. For example, referring again to data model 400, changes to a data center costs, will affect the AR table (AR table 412) that holds the assignment ratios for describing how costs from the data centers are allocated to the servers. In this example, a reduction in the cost of the Seattle Data Center in data center object 404 will impact the first two lines in AR table 412 that are associated with the Seattle data center.

At block 1008, in at least one of the various embodiments, the one or more other resource values may be modified based on the difference between the scenario resource value and the actual resource value. In at least one of the various embodiments, rather than applying the allocation rules of a data model to apply the scenario edits to the data model, the delta ratio may be applied directly to the relevant resource values.

In at least one of the various embodiments, if a given scenario edit is a reduction as compared to the original resource value, the related other scenario resource values may be reduced by the same percentage. Likewise, if the scenario edit is an increase in a resource value, the other related scenario resource value may be increased by the same proportion.

Accordingly, in at least one of the various embodiments, the cost modeling application may be arranged to iterate over the model object line items, and/or AR table line items that are impacted by the scenario edit(s) and adjust them directly based on the change in the original value. Note, these impacted line items are the line items that correspond to the other resource value discusses above. In some embodiments, this process applies the scenario edit delta ratios to just the line items/lines that would be most impacted if edit was made to the main data model, or otherwise fully computed using the application of the allocation rules.

Also, in at least one of the various embodiments, affected drill down AR tables (such as AR table 500 described in FIG. 5) may be iterated over to apply the scenario edit delta to affect lines. Note, absent this iteration and application of the delta value, the drill down table would have to be regenerated after the all the allocation rules for the data model have been re-applied. In production environment re-computing the resource values using allocation rules and then re-computing the drill down AR table may take hours or more depending on the size and complexity of the underlying data model.

In at least one of the various embodiments, iterating through the affected line items/lines enables the user to apply the scenario edits to the cloned data model without having to apply them to entire model or re-run the allocation rules and re-generation of the drill-down AR tables.

In at least one of the various embodiments, the 'in-place' application of the delta change proportions to the affected line items leaves the structure of the date model intact. Accordingly, in some embodiments, the affected value are changed while leaving the rest of the model structure/topology unaffected.

At block 1010, in at least one of the various embodiments, report information may be generated that include results based on the one or more scenario resource edits. In at least one of the various embodiments, since the structure of the cloned data model is the as the main data model, it may continue to be response to the same queries and/or reports that work for the main data model. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data models using a network computer that employs one or more processors to execute instructions that perform actions, comprising:

instantiating a main data model that includes one or more resource values and one or more model objects, wherein a data structure for the main data model includes a plurality of assignment ratio tables, including a first assignment ratio table that allocates the one or more resource values from one or more general ledger objects to one or more data center objects, a second assignment ratio table that allocates the one or more resource values from the one or more data center objects to one or more servers objects, and a third assignment ratio table that allocates the one or more resource values from the one or more servers objects to one or more applications objects;

instantiating a cloned data model that is based on the main data model, wherein the cloned data model just includes copied or modified resource values from the one or more resource values included in the main data model that are required to generate an estimated forecast for a what-if scenario with a reduced accuracy based on a lower level of line item granularity than provided by the main data model, wherein employing the just included one or more resource values of the cloned data model to generate the estimated forecast for the what-if scenario provides for creation of the cloned data model with just a fraction of its data duplicated;

when a user modifies the one or more resource values in the cloned data model, performing further actions, including:

providing a delta ratio value based on a difference between the one or more modified cloned resource values and their corresponding original resource values in the main data model;

providing one or more line items from the cloned data model, wherein each of the provided cloned line items is associated with the one or more modified cloned resource values;

modifying each of the one or more cloned line items based on the delta ratio value; and storing the one or more modified cloned line items in the cloned data model; and providing report information based on the cloned data model, wherein geolocation information based on electronic signals processed by a Global Positioning System (GPS) device is employed to modify a visual presentation in a display and one or more of a database, an internal process, or the report information based on a location of a client computer employed by the one or more users, wherein the modification includes one or more of time zone, currency, calendar format, or language, and wherein the report information indicates one or more changes to one or more other cloned resource values, and wherein the one or more changes are based on the modification of the one or more cloned resource values; and providing what-if delta ratio values for use in accelerated generation of one or more updated allocations for one or more of the plurality of assignment ratio tables for the cloned data model, wherein the what-if delta ratio values are based on line item edits of the cloned data model by a user.

2. The method of claim 1, further comprising, when data for the one or more modified cloned resource values is absent from the cloned data model, copying one or more line items from the main data model to the cloned data model, wherein the copied line items are associated with at least one model object that is associated with the one or more modified cloned resource values.

3. The method of claim 1, further comprising, providing one or more scenarios that include one or more constraints, including restricting the one or more other cloned resource values from being modified, restricting a range of modification values for the one or more cloned resource values, or restricting data types for the one or more cloned resource values.

4. The method of claim 1, wherein modifying each of the one or more cloned line items based on the delta ratio value, further comprises, modifying at least one cloned resource value by multiplying it by the delta ratio value.

5. The method of claim 1, wherein providing the cloned data model, further comprises:

providing access to the one or model objects and the one or more resource values; and when the cloned data model versions of the one or model objects and the one or more resources are modified by the user, copying data associated with the one or model objects and the one or more resources to the cloned data model.

6. The method of claim 1, further comprising:

providing one or more lines from one or more cloned assignment ratio tables from the cloned data model, wherein each of the provided lines is associated with the one or more modified cloned resource values; and modifying each of the one or more lines based on the delta ratio value.

7. The method of claim 1, wherein providing the one or more line items from the cloned data model, further comprises, traversing the cloned data model to identify the one or more cloned model objects that are allocated at least a portion of resources associated with the modified resource values.

8. The method of claim 1, further comprising:

caching at least a portion of the one or more resource values in the main data model when network communication is unavailable; and providing the cached at least portion of the one or more resource values to the cloned data model when network communication is available.

9. A system for managing data models, comprising:

a network computer, comprising:

a transceiver that communicates over the network;

a memory that stores at least instructions; and a processor device that executes instructions that perform actions, including:

instantiating a main data model that includes one or more resource values and one or more model objects, wherein a data structure for the main data model includes a plurality of assignment ratio tables, including a first assignment ratio table that allocates the one or more resource values from one or more general ledger objects to one or more data center objects, a second assignment ratio table that allocates the one or more resource values from the one or more data center objects to one or more servers objects, and a third assignment ratio table that allocates the one or more resource values from the one or more servers objects to one or more applications objects;

instantiating a cloned data model that is based on the main data model, wherein the cloned data model just includes copied or modified resource values from the one or more resource values included in the main data model that are required to generate an estimated forecast for a what-if scenario with a reduced accuracy based on a lower level of line item granularity than provided by the main data model, wherein employing the just included one or more resource values of the cloned data model to generate the estimated forecast for the what-if scenario provides for creation of the cloned data model with just a fraction of its data duplicated;

when a user modifies the one or more resource values in the cloned data model, performing further actions, including:

providing a delta ratio value based on a difference between the one or more modified cloned resource values and their corresponding original resource values in the main data model;

providing one or more line items from the cloned data model, wherein each of the provided cloned line items is associated with the one or more modified cloned resource values;

modifying each of the one or more cloned line items based on the delta ratio value; and storing the one or more modified cloned line items in the cloned data model; and providing report information based on the cloned data model, wherein geolocation information based on electronic signals processed by a Global Positioning System (GPS) device is employed to modify a visual presentation in a display and one or more of a database, an internal process, or the report information based on a location of a client computer employed by the one or more users, wherein the modification includes one or more of time zone, currency, calendar format, or language, and wherein the report information indicates one or more changes to one or more other cloned resource values, and wherein the one or more changes are based on the modification of the one or more cloned resource values; and providing what-if delta ratio values for use in accelerated generation of one or more updated allocations for one or more of the plurality of assignment ratio tables for the cloned data model, wherein the what-if delta ratio values are based on line item edits of the cloned data model by a user; and the client computer, comprising:
a transceiver that communicates over the network;
a memory that stores at least instructions; and
a processor device that executes instructions that perform actions, including:
providing the user-interface to a user; and
providing one or more modifications to the one or more cloned resource values.

10. The system of claim 9, wherein the network computer processor device executes instructions that perform actions, further comprising, when data for the one or more modified cloned resource values is absent from the cloned data model, copying one or more line items from the main data model to the cloned data model, wherein the copied line items are associated with at least one model object that is associated with the one or more modified cloned resource values.

11. The system of claim 9, wherein the network computer processor device executes instructions that perform actions, further comprising, providing one or more scenarios that include one or more constraints, including restricting the one or more other cloned resource values from being modified, restricting a range of modification values for the one or more cloned resource values, or restricting data types for the one or more cloned resource values.

12. The system of claim 9, wherein modifying each of the one or more cloned line items based on the delta ratio value, further comprises, modifying at least one cloned resource value by multiplying it by the delta ratio value.

13. The system of claim 9, wherein providing the cloned data model, further comprises:
providing access to the one or model objects and the one or more resource values; and
when the cloned data model versions of the one or model objects and the one or more resources are modified by the user, copying data associated with the one or model objects and the one or more resources to the cloned data model.

14. The system of claim 9, wherein the network computer processor device executes instructions that perform actions, further comprising:
providing one or more lines from one or more cloned assignment ratio tables from the cloned data model, wherein each of the provided lines is associated with the one or more modified cloned resource values; and
modifying each of the one or more lines based on the delta ratio value.

15. The system of claim 9, wherein providing the one or more line items from the cloned data model, further comprises, traversing the cloned data model to identify the one or more cloned model objects that are allocated at least a portion of resources associated with the modified resource values.

16. The system of claim 9, wherein the network computer processor device executes instructions that perform actions, further comprising:
caching at least a portion of the one or more resource values in the main data model when network communication is unavailable; and
providing the cached at least portion of the one or more resource values to the cloned data model when network communication is available.

17. A processor readable non-transitory storage media that includes instructions for managing data models, wherein execution of the instructions by a hardware processor performs actions, comprising:
instantiating a main data model that includes one or more resource values and one or more model objects, wherein a data structure for the main data model includes a plurality of assignment ratio tables, including a first assignment ratio table that allocates the one or more resource values from one or more general ledger objects to one or more data center objects, a second assignment ratio table that allocates the one or more resource values from the one or more data center objects to one or more servers objects, and a third assignment ratio table that allocates the one or more resource values from the one or more servers objects to one or more applications objects;
instantiating a cloned data model that is based on the main data model, wherein the cloned data model just includes copied or modified resource values from the one or more resource values included in the main data model that are required to generate an estimated forecast for a what-if scenario with a reduced accuracy based on a lower level of line item granularity than provided by the main data model, wherein employing the just included one or more resource values of the cloned data model to generate the estimated forecast for the what-if scenario provides for creation of the cloned data model with just a fraction of its data duplicated;
when a user modifies the one or more resource values in the cloned data model, performing further actions, including:
providing a delta ratio value based on a difference between the one or more modified cloned resource values and their corresponding original resource values in the main data model;
providing one or more line items from the cloned data model, wherein each of the provided cloned line items is associated with the one or more modified cloned resource values;
modifying each of the one or more cloned line items based on the delta ratio value; and storing the one or more modified cloned line items in the cloned data model; and providing report information based on the cloned data model, wherein geolocation information based on electronic signals processed by a Global Positioning System (GPS) device is employed to modify a visual presentation in a display and one or more of a database, an internal process, or the report information based on a location of a client computer employed by the one or more users, wherein the modification includes one or more of time zone, currency, calendar format, or language, and wherein the report information indicates one or more changes to one or more other cloned resource values, and wherein the one or more changes are based on the modification of the one or more cloned resource values; and providing what-if delta ratio values for use in accelerated generation of one or more updated allocations for one or more of the plurality of assignment ratio tables for the cloned data model, wherein the what-if delta ratio values are based on line item edits of the cloned data model by a user.

18. The media of claim 17, further comprising, when data for the one or more modified cloned resource values is absent from the cloned data model, copying one or more line items from the main data model to the cloned data model, wherein the copied line items are associated with at least one model object that is associated with the one or more modified cloned resource values.

19. The media of claim 17, further comprising, providing one or more scenarios that include one or more constraints, including restricting the one or more other cloned resource values from being modified, restricting a range of modification values for the one or more cloned resource values, or restricting data types for the one or more cloned resource values.

20. The media of claim 17, wherein modifying each of the one or more cloned line items based on the delta ratio value, further comprises, modifying at least one cloned resource value by multiplying it by the delta ratio value.

21. The media of claim 17, wherein providing the cloned data model, further comprises:
providing access to the one or model objects and the one or more resource values; and
when the cloned data model versions of the one or model objects and the one or more resources are modified by the user, copying data associated with the one or model objects and the one or more resources to the cloned data model.

22. The media of claim 17, further comprising:
providing one or more lines from one or more cloned assignment ratio tables from the cloned data model, wherein each of the provided lines is associated with the one or more modified cloned resource values; and
modifying each of the one or more lines based on the delta ratio value.

23. The media of claim 17, wherein providing the one or more line items from the cloned data model, further comprises, traversing the cloned data model to identify the one or more cloned model objects that are allocated at least a portion of resources associated with the modified resource values.

24. A network computer for managing data models, comprising:
a transceiver that communicates over the network;
a memory that stores at least instructions; and
a processor device that executes instructions that perform actions, including:
instantiating a main data model that includes one or more resource values and one or more model objects, wherein a data structure for the main data model includes a plurality of assignment ratio tables, including a first assignment ratio table that allocates the one or more resource values from one or more general ledger objects to one or more data center objects, a second assignment ratio table that allocates the one or more resource values from the one or more data center objects to one or more servers objects, and a third assignment ratio table that allocates the one or more resource values from the one or more servers objects to one or more applications objects;
instantiating a cloned data model that is based on the main data model, wherein the cloned data model just includes copied or modified resource values from the one or more resource values included in the main data model that are required to generate an estimated forecast for a what-if scenario with a reduced accuracy based on a lower level of line item granularity than provided by the main data model, wherein employing the just included one or more resource values of the cloned data model to generate the estimated forecast for the what-if scenario provides for creation of the cloned data model with just a fraction of its data duplicated;
when a user modifies the one or more resource values in the cloned data model, performing further actions, including:
providing a delta ratio value based on a difference between the one or more modified cloned resource values and their corresponding original resource values in the main data model;
providing one or more line items from the cloned data model, wherein each of the provided cloned line items is associated with the one or more modified cloned resource values;
modifying each of the one or more cloned line items based on the delta ratio value; and
storing the one or more modified cloned line items in the cloned data model; and
providing report information based on the cloned data model, wherein geolocation information based on electronic signals processed by a Global Positioning System (GPS) device is employed to modify a visual presentation in a display and one or more of a database, an internal process, or the report information based on a location of a client computer employed by the one or more users, wherein the modification includes one or more of time zone, currency, calendar format, or language, and wherein the report information indicates one or more changes to one or more other cloned resource values, and wherein the one or more changes are based on the modification of the one or more cloned resource values; and
providing what-if delta ratio values for use in accelerated generation of one or more updated allocations for one or more of the plurality of assignment ratio tables for the cloned data model, wherein the what-if delta ratio values are based on line item edits of the cloned data model by a user.

25. The network computer of claim 24, further comprising, when data for the one or more modified cloned resource values is absent from the cloned data model, copying one or more line items from the main data model to the cloned data model, wherein the copied line items are associated with at least one model object that is associated with the one or more modified cloned resource values.

26. The network computer of claim 24, further comprising, providing one or more scenarios that include one or more constraints, including restricting the one or more other cloned resource values from being modified, restricting a range of modification values for the one or more cloned resource values, or restricting data types for the one or more cloned resource values.

27. The network computer of claim 24, wherein modifying each of the one or more cloned line items based on the delta ratio value, further comprises, modifying at least one cloned resource value by multiplying it by the delta ratio value.

28. The network computer of claim 24, wherein providing the cloned data model, further comprises:
providing access to the one or model objects and the one or more resource values; and
when the cloned data model versions of the one or model objects and the one or more resources are modified by the user, copying data associated with the one or model objects and the one or more resources to the cloned data model.

29. The network computer of claim 24, further comprising:
providing one or more lines from one or more cloned assignment ratio tables from the cloned data model, wherein each of the provided lines is associated with the one or more modified cloned resource values; and
modifying each of the one or more lines based on the delta ratio value.

30. The network computer of claim 24, wherein providing the one or more line items from the cloned data model, further comprises, traversing the cloned data model to identify the one or more cloned model objects that are allocated at least a portion of resources associated with the modified resource values.

* * * * *